United States Patent
Schaecher et al.

(10) Patent No.: US 11,371,341 B2
(45) Date of Patent: Jun. 28, 2022

(54) USE OF TOOL DATA TO EQUALIZE A CHANNEL RESPONSE

(71) Applicant: Halliburton Energy Services, Inc., Houston, TX (US)

(72) Inventors: William Joseph Schaecher, Houston, TX (US); Jianqiang Zeng, Cypress, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 103 days.

(21) Appl. No.: 16/757,565

(22) PCT Filed: Jul. 15, 2019

(86) PCT No.: PCT/US2019/041796
§ 371 (c)(1),
(2) Date: Apr. 20, 2020

(87) PCT Pub. No.: WO2021/010958
PCT Pub. Date: Jan. 21, 2021

(65) Prior Publication Data
US 2021/0404325 A1 Dec. 30, 2021

(51) Int. Cl.
*E21B 47/12* (2012.01)
*H04B 1/10* (2006.01)
*H04B 3/04* (2006.01)

(52) U.S. Cl.
CPC ............. *E21B 47/12* (2013.01); *H04B 1/10* (2013.01); *H04B 3/04* (2013.01)

(58) Field of Classification Search
None
See application file for complete search history.

(56) References Cited

U.S. PATENT DOCUMENTS

| 7,940,192 | B2 | 5/2011 | Reckmann et al. |
| 9,822,634 | B2 | 11/2017 | Gao |
| 2002/0180613 | A1 | 12/2002 | Shi et al. |
| 2007/0201308 | A1* | 8/2007 | Wassermann ........... E21B 47/18 367/82 |

(Continued)

OTHER PUBLICATIONS

PCT Application Serial No. PCT/US2019/041796, International Search Report, dated Apr. 10, 2020, 3 pages.

(Continued)

*Primary Examiner* — Adolf Dsouza
(74) *Attorney, Agent, or Firm* — Delizio, Peacock, Lewin & Guerra

(57) ABSTRACT

A logging tool is positioned downhole in a wellbore, where the logging tool communicates with a computer on the Earth's surface over an analog signal path. Tool data is received from a sensor associated with the logging tool and encoded into a symbol signal. The symbol signal is transmitted to a receiver system via the analog signal path. The receiver system has one or more filters to filter the symbol signal. The one or more filters includes an equalizer filter indicative of an analog signal path response of the analog signal path. The filtered symbol signal is decoded into second tool data. The second tool data is encoded into second symbols and based on the second symbols, an updated analog signal path response of the analog signal path is generated to update the equalizer filter.

20 Claims, 15 Drawing Sheets

(56) References Cited

U.S. PATENT DOCUMENTS

2013/0088363 A1     4/2013   Gonzalez
2018/0245457 A1*   8/2018   Eadala ................ H04L 25/0305
2019/0052374 A1     2/2019   Lie et al.

OTHER PUBLICATIONS

PCT Application Serial No. PCT/US2019/041796, International Written Opinion, dated Apr. 10, 2020, 5 pages.

Smalley, "Equalization Concepts: A Tutorial", Texas Instruments, Oct. 1994; 30 pages.

Tennent, et al., "Passband complex fractionally-spaced equalization of MSK signals over the mud pulse telemetry channel", First IEEE Signal Processing Workshop on Signal Processing Advances in Wireless Communications, Paris, France, 1997, pp. 5-8.

* cited by examiner

USE OF TOOL DATA TO EQUALIZE A CHANNEL RESPONSE

TECHNICAL FIELD

The disclosure generally relates to the field of data communications between a logging tool positioned downhole in a wellbore of a geologic formation which provides tool data and a computer on the surface, and more particularly to use of the tool data provided by the logging tool to equalize a channel response to facilitate communication between the logging tool and the computer over a channel which communicatively couples the logging tool to the computer.

BACKGROUND ART

A logging tool is attached to a wireline and lowered into a wellbore of a geologic formation to determine properties of rock in the wellbore and their contained fluids. The logging tool has one or more sensors that generate tool data associated with various measurements performed downhole (e.g., natural gamma ray, electrical, acoustic, pressure, stimulated radioactive, electromagnetic, and/or nuclear magnetic resonance). The logging tool has a transmitter system which encodes the tool data into symbols and transmits the symbols over a cable to a receiver system associated with a computer on the Earth's surface. The cable physically connects the transmitter system to the receiver system and is typically integrated with the wireline. The receiver system receives the transmitted symbols and decodes the symbols back into the tool data. Based on the tool data, the computer generates formation logs associated with properties of the geologic formation for presentation to engineering personnel, among other purposes.

The cable initially has a cable response that allows the transmitter system to reliably transmit the symbols and the receiver system to reliably receive the symbols. The cable response includes a frequency and/or phase response of the cable. This cable response changes as the cable is lowered downhole by the wireline. For example, the cable is stretched by the weight of the logging tool when lowered downhole, narrowing a diameter of the cable, and changing the cable response. As another example, the cable is compressed by downhole pressures, narrowing a diameter of the cable as it is lowered downhole, and changing the cable response. In yet another example, the cable is exposed to extreme temperatures downhole, which changes the cable response. The changed cable response adds noise to the cable, distorts the symbols carried by the cable, and produces inter-symbol interference (ISI). ISI is where one symbol interferes with another symbol. In presence of ISI, the receiver system is no longer able to reliability decode the symbols received from the transmitter system back into the tool data.

Figure 1:
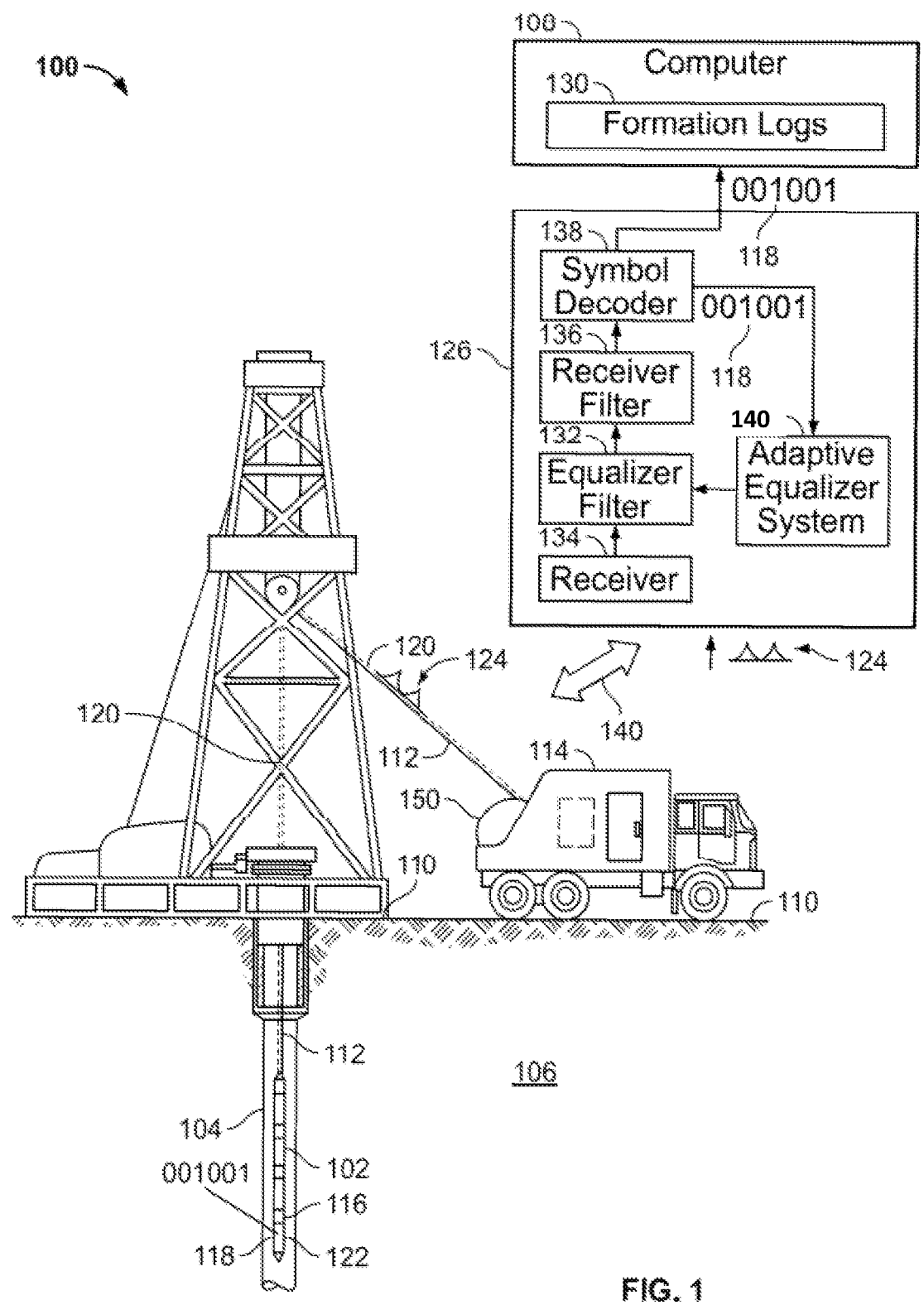
FIG. 1 illustrates an example system for reducing ISI associated with data communication between a logging tool lowered into a wellbore of a geologic formation via a conveyance in the form of a wireline and a computer located on the Earth's surface of the geologic formation.

The drawings are for purpose of illustrating example embodiments, but it is understood that the inventions are not limited to the arrangements and instrumentalities shown in the drawings.

DESCRIPTION OF EMBODIMENTS

The description that follows includes example systems, methods, techniques, and program flows that embody aspects of the disclosure. However, it is understood that this disclosure may be practiced without these specific details. For instance, this disclosure refers to equalization of a channel response to facilitate communication over a channel which communicatively couples a logging tool downhole in a wellbore and a computer on the Earth's surface. Aspects of this disclosure can instead be applied to communication other than between the logging tool and computer. In other instances, well-known instruction instances, protocols, structures and techniques have not been shown in detail in order not to obfuscate the description.

Overview

A communication channel between a logging tool in a wellbore and the surface has a channel response. Knowledge of this channel response is used to reduce intersymbol interference (ISI) associated with symbols transmitted over the communication channel. The channel response is determined in a training process. Symbols representing tool data (e.g., formation measurements performed by the logging tool) are typically transmitted from a transmitter system associated with the logging tool to a receiver system over the communication channel. This transmission is periodically stopped and/or reduced and the available bandwidth is used to send training symbols to the receiver system. Based on noise, multipath propagation effects, and/or physical changes in the communication channel, the training symbols are distorted as they are transmitted from the transmitter system to the receiver system. An undistorted version of the training symbols is already known to the receiver system and is not transmitted from the transmitter system to the receiver system. The receiver system evaluates the distortion in the training symbols based on the undistorted version of the training symbols already known to determine filter coefficients of the channel response. An equalizer filter is then set to an inverse of the filter coefficients. The receiver system applies this equalizer filter to the symbols associated with the tool data received over the communication channel to reduce ISI.

The channel response can change over time for various reasons as the logging tool is positioned in the wellbore. For example, a geometry of a cable associated with the communication channel changes as the logging tool is lowered downhole resulting in the cable response and channel response changing. As another example, capacitive fields and inductive fields downhole can change the cable response and channel response. To account for these changes, the equalizer filter is periodically updated by sending the training symbols from the transmitter system to the receiver system to determine the change in the channel response. Because tool data is not transmitted and/or transmission of tool data is reduced during this update process, throughput for transmitting the tool data between the transmitter system and receiver system is reduced.

Embodiments disclosed herein are directed to an improved process for reducing ISI associated with communication between the transmitter system associated with the logging tool and the receiver system. The tool data is used to update the equalizer filter rather than using the training symbols. As a result, the equalizer filter is updated as the tool data is also being communicated rather than having to stop and/or reduce transmission of the tool data to transmit the training symbols to update the equalizer filter.

The tool data that is used to update the equalizer filter originates at the logging tool. The transmitter system encodes tool data from the logging tool downhole into symbols and transmits the symbols to the receiver system via the communication channel. The receiver system receives the symbols, and decodes the symbols into the tool data. The receiver system has an adaptive equalizer to reduce ISI on the communication channel due to changes in the channel response. The adaptive equalizer system has a symbol encoder, channel response filter, and adaptive equalizer. The symbol encoder receives the tool data from the symbol decoder and encodes the tool data into symbols in a manner similar to how the transmitter system encoded the tool data into the symbols. The symbols are then filtered by the channel response filter. A response of the channel response filter matches a response of a receiver filter associated with the receiver system and a transmitter filter associated with the transmitter system in the communication channel. The response of the transmitter filter and receiver filter has a bandwidth associated with an initial bandwidth of an analog signal path associated with the communication channel and indicates a desired channel response to reduce ISI. In some examples, the analog signal path is a cable coupled to the logging tool. Based on noise, multipath propagation effects, and/or physical changes in the analog signal path, the analog signal path response changes and the channel response changes. The adaptive equalizer receives the filtered symbols from the channel response filter and the symbols received from the transmitter system after filtering by the equalizer filter and receiver filter. The adaptive equalizer designs filter coefficients which when applied to the received symbols from the receiver filter minimizes a difference to the filtered symbols from the channel response filter. The equalizer filter is updated with an inverse of the filter coefficients. The symbols from the transmitter system are filtered with the updated equalizer filter and the distortion to symbols introduced by changes to the analog signal path response continues to be reduced even though the analog signal path response is changing. By adapting based on die received tool data, bandwidth is not consumed in updating the equalizer filter using training symbols as part of a training process when tool data is not sent. The channel response continues to be equalized while the tool data provided by the logging tool continues to be transmitted.

The description that follows includes example systems, apparatuses, and methods that embody aspects of the disclosure. However, it is understood that this disclosure may be practiced without these specific details. In other instances, well-known structures and techniques have not been shown in detail in order not to obfuscate the description.

Example Illustrations

FIG. 1 illustrates an example system 100 for reducing ISI associated with data communication between a logging tool 102 lowered into a wellbore 104 of a geologic formation 106 via a conveyance in the form of a wireline 112 and a computer 108 located on the Earth's surface 110 of the geologic formation. The system 100 shows logging tool (or generally "tool") 102 suspended on the conveyance in the form of the wireline 112 in the wellbore 104. As described in further detail below, the conveyance may take other forms including but not limited to a wireline slickline, coiled tubing, piping, downhole tractor, and/or a combination thereof. Further, it should be noted that while a land-based drilling system is depicted, those skilled in the art will readily recognize that the principles described herein are equally applicable to subsea drilling operations that employ floating or sea-based platforms and rigs, without departing from the scope of the disclosure.

The logging tool 102 may be lowered in the wellbore 104 in many ways while attached to the wireline 112. As illustrated, spool 150 of wireline 112 may be used to run the logging tool 102 into the wellbore 104. The spool 150 may be disposed on a recovery vehicle 114. The wireline 112 may be wound and unwound from the spool 150, for example, to raise and lower the wireline 112 in the wellbore 104, While spool 150 is shown on recovery vehicle 114 it should be understood the wireline 112 may alternatively be disposed from a spool that is on the Earth's surface 108 instead of being located on recovery vehicle 114.

Logging tool 102 may comprise a tool body. Tool body may be any suitable material, including without limitation titanium, stainless steel, alloys, plastic, combinations thereof, and the like. The logging tool 102 may have a probe or "sonde" that houses sensors 116 for performing various measurements downhole associated with determining properties of rock and their contained fluid downhole in the geologic formation 106. The various measurements that can be performed include, for example, natural gamma ray, electrical, acoustic, stimulated radioactive responses, electromagnetic, nuclear magnetic resonance, and pressure measurements.

Tool data may represent results of the measurements performed by the logging tool 102. The tool data 118 may be digital data such as bits. In some examples, a cable 120 may be attached to and/or integrated with the wireline 112. The cable 120 may take the form of an electrical cable, twisted pair cable, or optical fiber cable which is attached to the logging tool 102 and defines an analog signal path between the logging tool 102 and the computer 108. The logging tool 102 may have a transmitter system 122 for receiving the tool data 118 from the formation sensors 116 and encoding the tool data 118 into symbols 124 which are then transmitted via the cable 120. The symbols 124 may take the form of an analog signals with a given amplitude that is uniquely associated with one or more of the tool data. A receiver system 126 coupled to the computer 108 receives the symbols 124 over the cable 120. The receiver system 126 may be communicatively coupled to the cable 120 via a wired or wireless connection. The receiver system 126 decodes the symbols 124 back into the tool data 118 which is provided to the computer 108 to generate formation logs 130 indicative of formation properties downhole in the wellbore 106 as a function of depth, such as resistive logs, acoustic logs, and nuclear logs, among other types. In other examples, the receiver system 126 may be part of the computer 128 such that the computer 108 receives the tool data 118 from the receiver system 126 which is also part of the computer 128.

The analog signal path defined by the cable may have an analog signal path response. Further, the transmitter system 122, cable 120, and receiver system 126 may define a communication channel with a channel response. ISI is a form of distortion where one symbol interferes with another symbol, causing successive symbols to blur together and making communication of the symbols less reliable. In the case that the analog signal path is the cable, the channel response may change as the cable 120 attached to the logging tool 102 is lowered downhole, producing ISI. For example, the cable 120 is stretched by a weight of the logging tool 102 when lowered downhole, narrowing a diameter of the cable 120, and changing the analog signal path response and channel response. As another example, the cable 120 is compressed by downhole pressures, also narrowing a diameter of the cable 120 as it is lowered downhole, and changing the analog signal path response and channel response. In yet another example, the cable 120 is exposed to extreme temperatures, capacitive fields, inductive fields downhole, which changes the analog signal path response and the channel response. As another example, an amount of the cable 120 spooled on the spool 150 on the Earth's surface 110 versus lowered downhole changes the analog signal path response and channel response. The changed analog signal path response distorts the symbols carried by the cable 120 which causes ISI. The ISI changes a representation of the symbol. For example, a symbol when transmitted by the transmitter system 122 may have one amplitude but with ISI the symbol received by the receiver system 126 may have another amplitude. The symbols are no longer able to be reliably communicated.

To reduce the distortion and resulting ISI, the receiver system 126 may have a receiver 134, equalizer filter 132, receiver filter 136, and symbol decoder 138. The receiver 134 receives the symbols 124 and the equalizer filter 132 filters the received symbols 124 to reduce the distortion introduced by the changed analog signal path response and resulting channel response. The equalizer filter 132 may be a filter which is an inverse to the analog signal path response. The filtered symbols are provided to a receiver filter 136 which further filters the filtered symbols to reduce ISI. Based on an output of the receiver filter 136, the symbol decoder 138 generates the tool data 118 which should match the tool data 118 that the transmitter system 122 encoded for transmission.

Because the analog signal path response can dynamically change as the logging tool is lowered into the wellbore, an adaptive equalizer system 140 further updates the equalizer filler 132 so that it continues to represent the inverse of the analog signal path response. The adaptive equalizer system 140 receives the tool data 118 which is output by the receiver system 126 and generates an updated equalization filter so that the symbols 124 are filtered with the updated equalizer filter and the distortion to symbols 124 introduced by changes to the channel response and ISI continues to be reduced even though the channel response is changing. Without this equalization, the symbol decoder 138 may incorrectly decode the symbols associated with the symbols 124 received by the receiver 134. Also, by adapting based on the received tool data 118, additional bandwidth is not consumed in updating the equalizer filter 132 using training symbols as part of a training process. The transmission of the tool data 118 provided by the logging tool 102 does not need to be stopped and/or reduced to update the equalizer filter 132.

Figure 2:
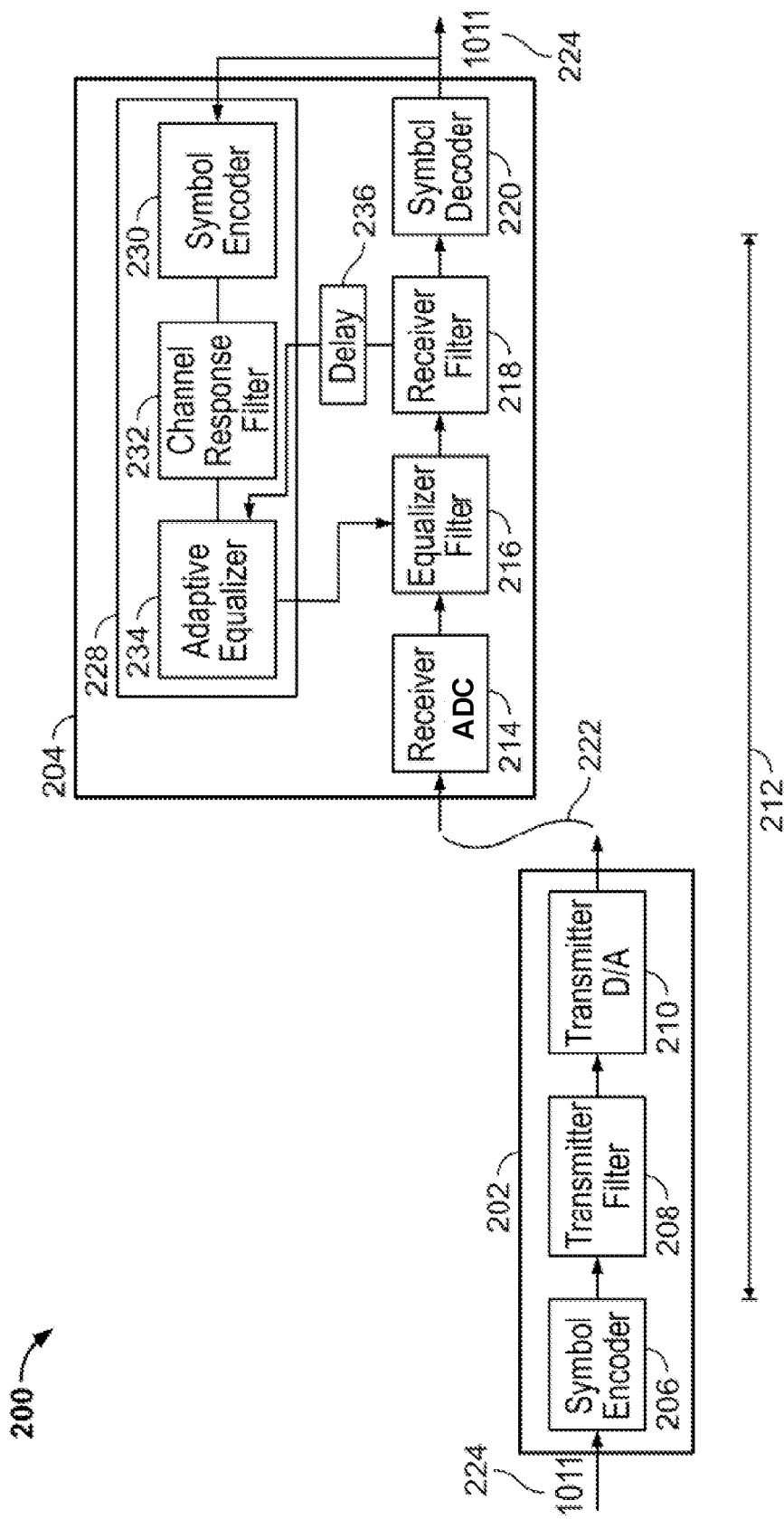
FIG. 2. illustrates an example block diagram associated with transmission of symbols with reduced ISI between a transmitter system associated with the logging tool and a receiver system.

FIG. 2 illustrates an example block diagram 200 associated with transmission of symbols with reduced ISI between a transmitter system 202 associated with a logging tool lowered downhole in a geologic formation and a receiver system 204 located on the Earth's surface of the geologic formation. The transmitter system 202 may include a symbol encoder 206, transmitter filter 208, and transmitter DAC 210 (digital to analog converter). The receiver system 204 may include a receiver ADC 214 (analog to digital converter), equalizer filter 216, receiver filter 218, and symbol decoder 220. An analog signal path 222 may couple the transmitter system 202 and receiver system 204 such that communication between the symbol encoder 206 and the symbol decoder 220 defines a communication channel 212. Consistent with FIG. 1, the analog signal path 222 may take the form of the cable 120, but as described in further detail below, the analog signal path 222 may take other forms such as the geologic formation itself when communication is based on electromagnetic or acoustic telemetry or mud when communication is based on pressure pulse telemetry. The processing blocks are illustrated as discrete functions for ease of explanation, but functions associated with the blocks may be combined and/or rearranged in accordance with the described examples. The transmitter system 202 may be located downhole while the receiver system 204 is located on the Earth's surface.

Tool data 224 may represent the measurements perforated by the logging tool in the wellbore. Digital data such as bits may represent the tool data 224. The transmitter system 202 and receiver system 204 may facilitate transmission of the tool data 224 to the Earth's surface. The symbol encoder 206 may facilitate this transmission by encoding the tool data 224 into symbols indicative of the tool data 224. These symbols may be output onto the analog signal path 222 to recover the tool data 224 which was encoded by the symbol encoder 206.

The logging tool may generate, for example, one-bit values associated with measurements. For example, the tool data may include a sequence of bits:

1,0,0,1,1,1,0,0,0,0,0,0,1,0,0,1

The bits are mapped into symbols based on a mapping where a "1" bit is assigned a symbol with a symbol level of "1" while a "0" bit is assigned a symbol with a symbol level of "−1" resulting in the following symbols in this example:

1,−1,−1,1,1,1,−1,−1,−1,−1,−1,−1,1,−1,−1,1

Figure 3:
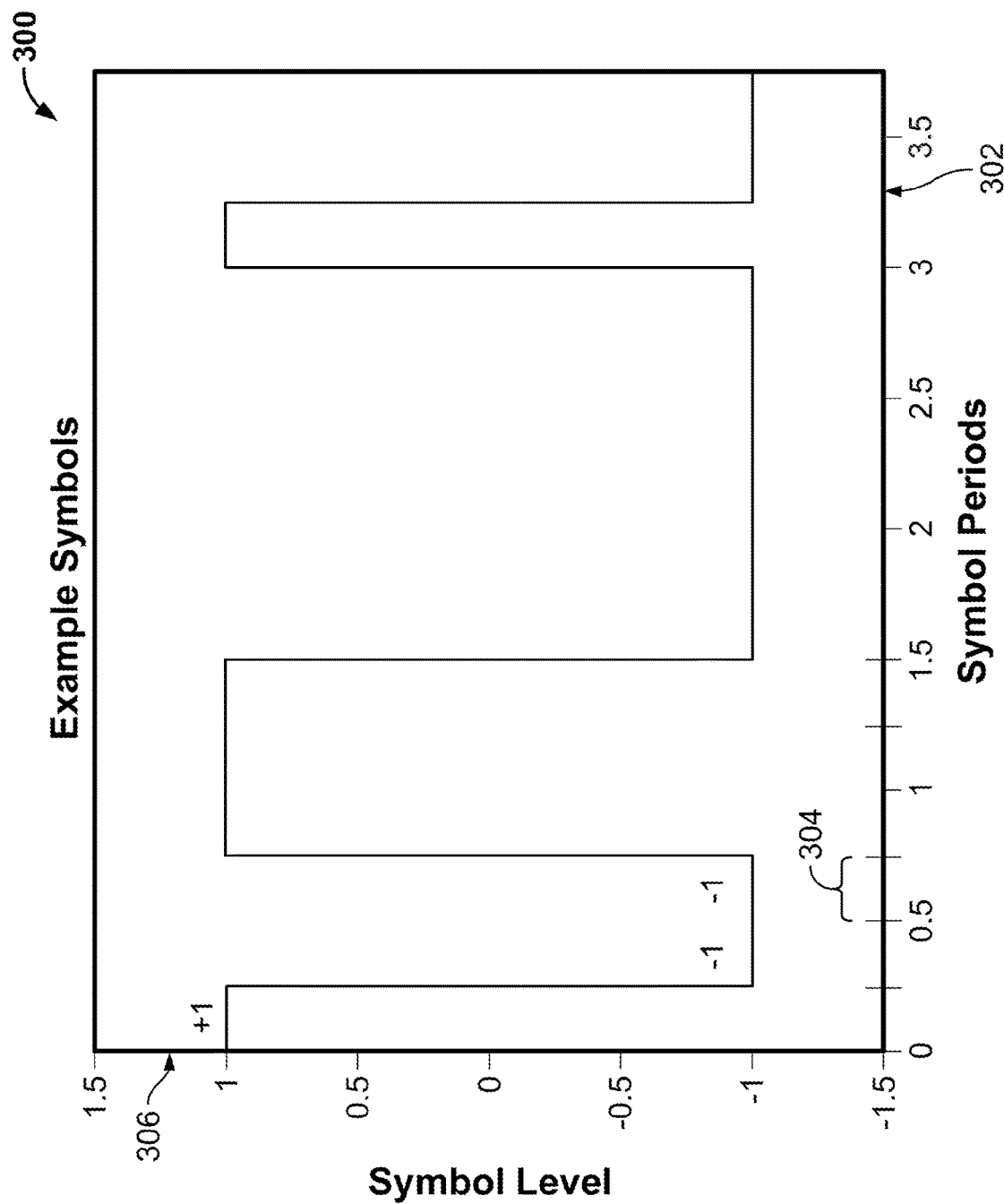
FIG. 3 illustrates example symbols associated with tool data generated by the logging tool.

FIG. 3 illustrates an example of the symbols 300 graphically. Axis 302 is subdivided into symbol periods 304 associated with durations of the symbols. In each symbol period, respective tool data is assigned to a symbol. Axis 306 indicates a symbol level of the symbol assigned during the symbol period. The symbol level assigned is either −1 or 1. The symbols may take other forms including impulses instead of square waves which are illustrated.

A bandwidth to transmit the symbols increases as the symbol rate increases. When the bandwidth becomes larger than a channel bandwidth associated with the communication channel 212, the communication channel 212 starts to introduce distortion to the symbols. This distortion usually manifests itself as ISI. To reduce the ISI, the channel response needs to satisfy a Nyquist theorem. The Nyquist theorem states that in order to prevent aliasing of a band-limited signal, the baud-limited signal must be sampled at a rate of at least 2.5 times the frequency of the band-limited signal. For example, if the logging tool generates tool data at a frequency of N symbols/second, the symbols must be represented by samples at a sample rate of at least 2.5×N samples/sec, where 2.5 is a sampling factor. The symbol encoder 206 may output the samples associated with the symbols at the sampling rate in many ways. The symbol in a symbol period may be considered a given sample with a sample value equal to the symbol level. The symbol encoder 206 may insert zeroes as samples between each of these given symbol samples to achieve the sampling factor greater than 2.5 for a symbol rate. For a sample factor of 8 which is greater than the sampling factor of 2.5, 7 samples of zeroes may be inserted between each sample associated with the symbol. For a sample factor of 2.5, 4 samples of zeroes may be inserted between each sample associated with a symbol and after digital filtering as described below, every other sample is discarded. Other variations are also possible.

Figure 4:
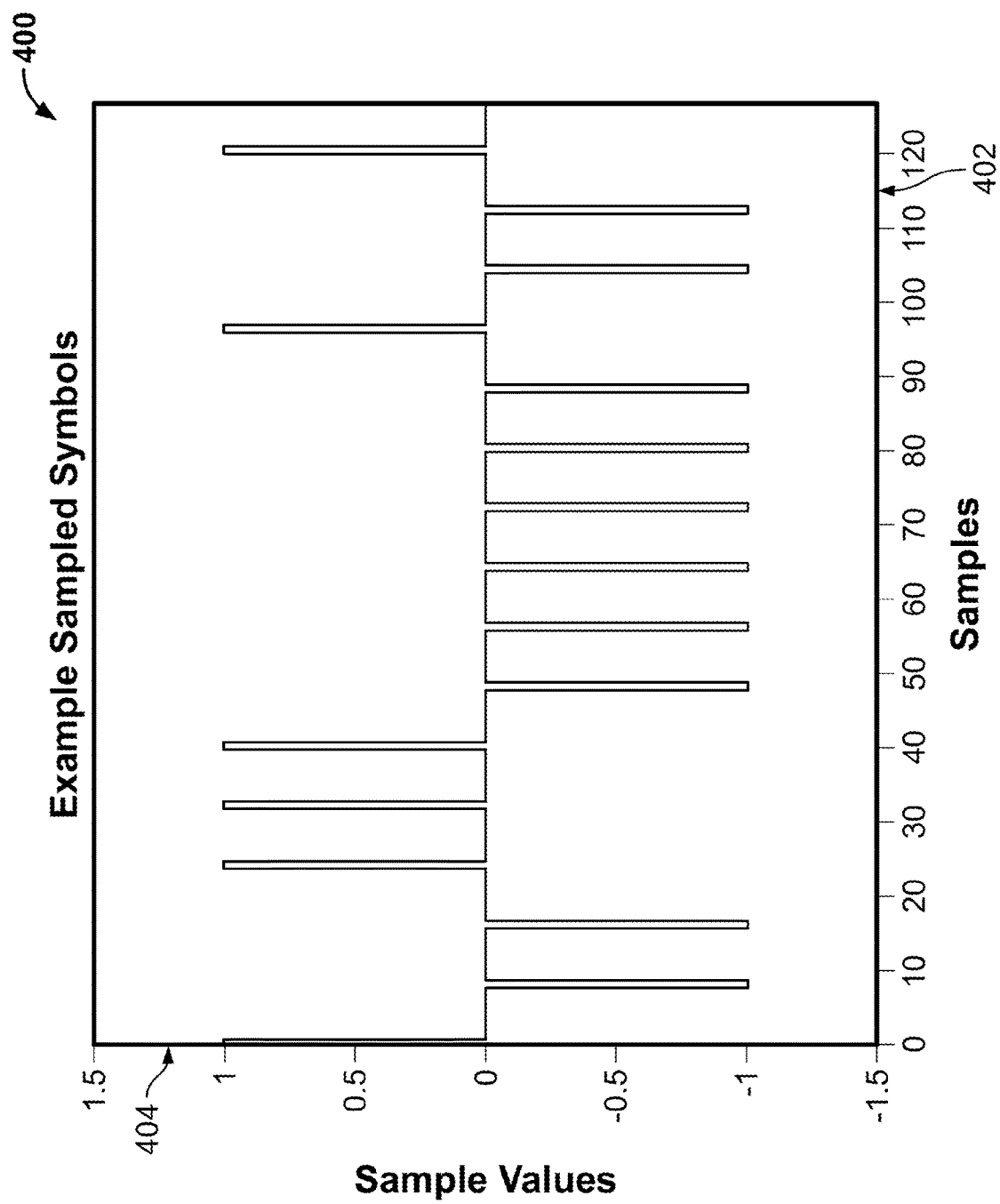
FIG. 4 illustrates example samples associated with a sampling of the symbols.

FIG. 4 illustrates example sampled symbols 400 associated with sampling the symbols by the factor of 8. The samples are identified on the axis 402 and the sample values associated with the samples are identified on axis 404. The sample values alternate between −1, 0 and 1. Each symbol is associated with 8 samples within each symbol period.

Various digital filters may be applied to the samples associated with sampling the symbols as part of a pulse shaping process to limit a bandwidth of the samples. The purpose of the digital filter is to limit the bandwidth of the samples to fit an initial bandwidth of the analog signal path. The digital filter may take the form of a sine function (sin(x)/x), raised cosine function, and/or Gaussian function, among other functions. The digital filter may be designed with a same bandwidth as the analog signal path and indicate a desired channel response which reduces ISI.

The digital filter may be distributed between the transmitter system 202 and receiver system 204 as the transmitter filter 208 and receiver filter 218 so that the channel response takes the form of a response of the digital filter. For instance, a transmitter filter 208 and receiver filter 218 may be pointwise square roots of the digital filter such as a square root raised cosine filters which in combination produces a raised cosine response over the communication channel 212. In another example, the digital filter may be positioned at the transmitter filter 208 and the receiver system 204 may not have the receiver filter 218. In yet another example, the channel response filter may be positioned at the receiver system 204 and the transmitter system 202 may not have a transmitter filter 208.

Figure 5:
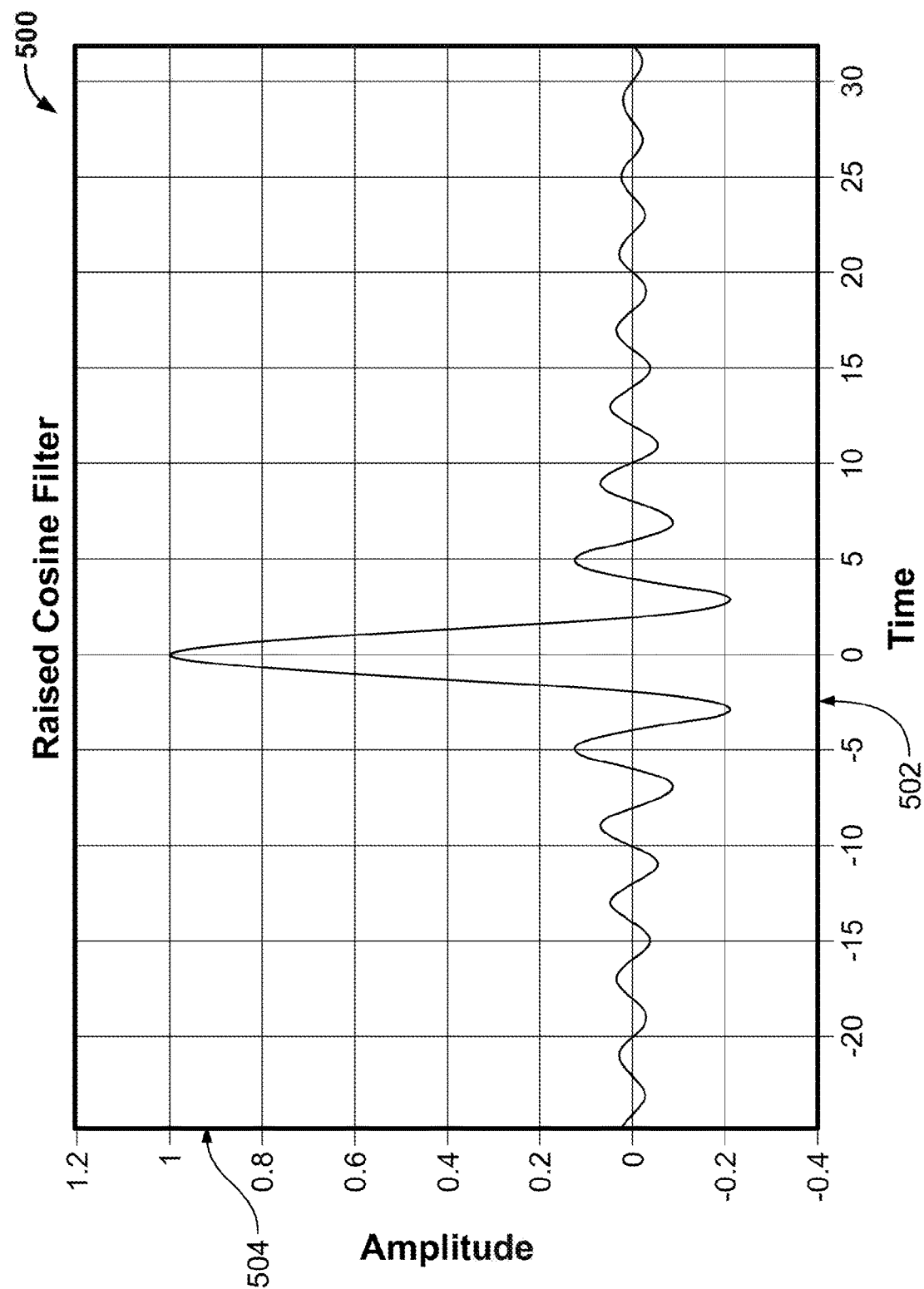
FIG. 5 illustrates an example of a digital filter in the form of a raised cosine filter.

FIG. 5 illustrates an example of the digital filter in the form of a raised cosine filter 500. The raised cosine filter 500 is plotted as a function of time on axis 502 and amplitude on axis 504. The raised cosine filter 500 may be a composite of the square root raised cosine filters at the transmitter filter and receiver filter. The raised cosine filter 500, like the sine function (sin(x)/x), raised cosine function, and/or Gaussian function, has a response with an amplitude that crosses zero between symbol periods, which when applied to the samples of the symbols reduces ISI.

Figure 6:
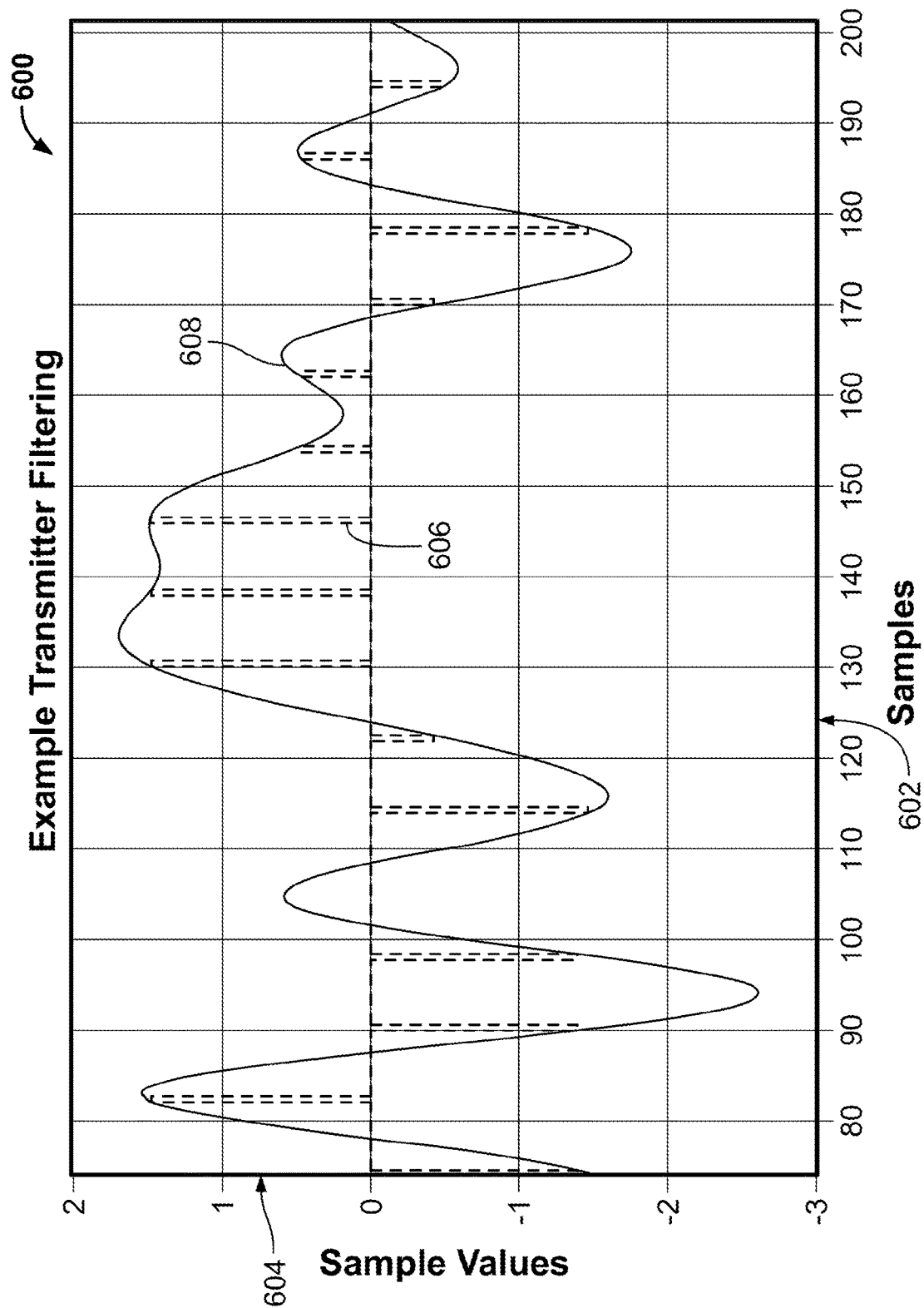
FIG. 6 illustrates an example of filtering the samples with the digital filter.

FIG. 6 illustrates an example of filtering the samples with the digital filter in a filtering process 600. Axis 602 identifies the samples and axis 604 identifies sample values associated with the samples. The filtering process 600 involves filtering the samples 606 shown as dashed pulses with the raised cosine filter to bandlimit the samples 606 to the channel bandwidth. The raised cosine filter filters the samples 606 to produce a composite output 608. An amplitude of the composite output 608 coincides with sample values of the samples associated with the symbols (as opposed to the zeros inserted as samples) when there is no ISI. With no ISI, the sample values of the samples associated with one symbol are not changed by the samples associated with another symbol.

The transmitter 210 then transmits the samples filtered by the transmitter filter 208 over the analog signal path 222 to the receiver system 204. The transmitter 210 may have a digital to analog converter (DAC) for converting the samples into an analog signal for transmission over the analog signal path 222. The samples may be converted into the analog signal by converting the sample values of each symbol sample to an analog voltage which is output by the transmitter 210 as a symbol signal.

Figure 7:
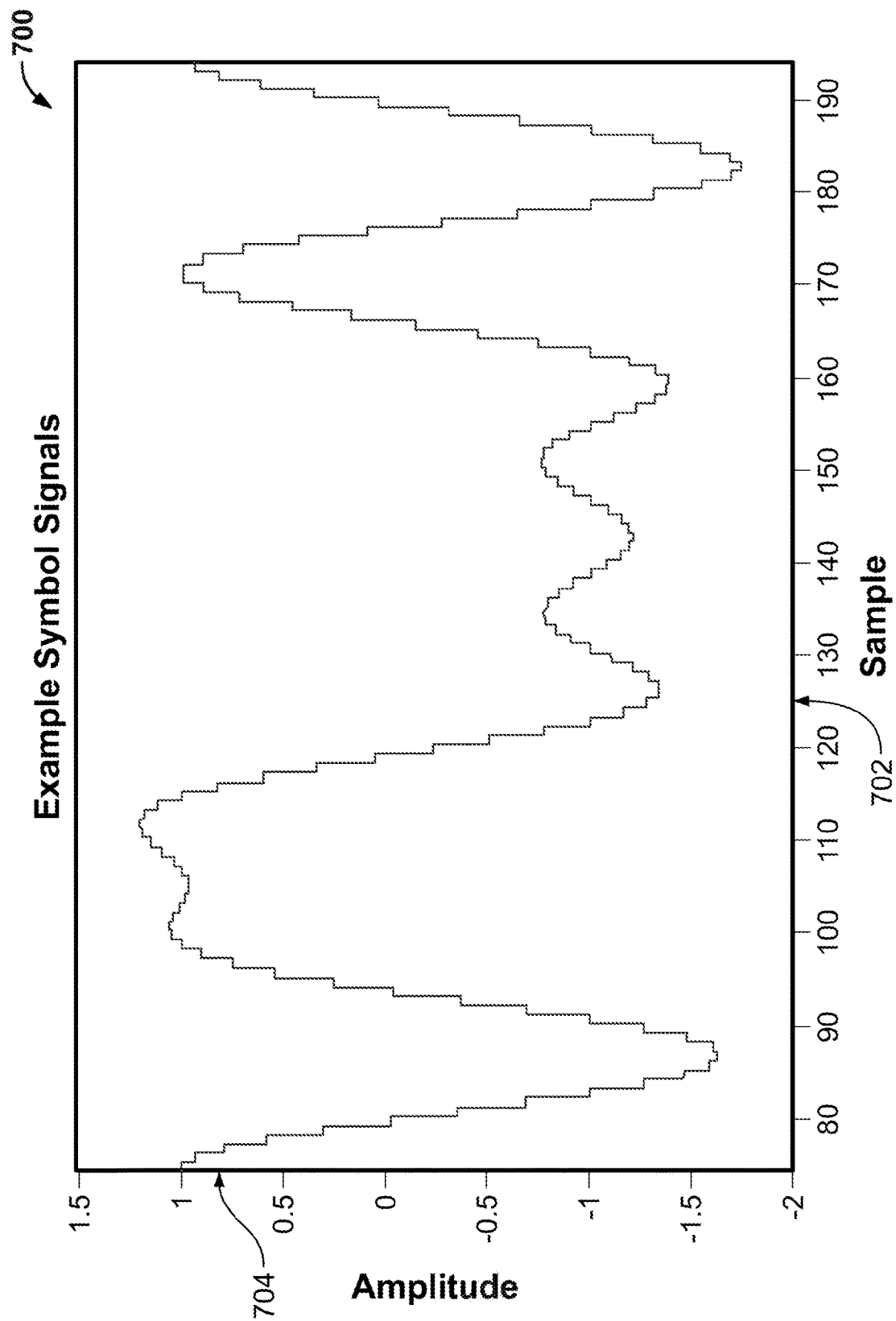
FIG. 7 illustrates an example of a symbol signal generated based on the samples filtered by the digital filter.

FIG. 7 illustrates an example of the symbol signal 700. The symbol signal is plotted as a function of amplitude on axis 704 and sample on axis 702. The amplitude may be a voltage level corresponding the samples, such that the symbol signal 700 takes the form of a plurality of electromagnetic pulses indicative of the symbols.

The analog signal path 222 communicates the symbol signal 700 to the receiver system 204. In practice, application of the digital filter can still result in the communication channel 212 producing ISI. The ISI is produced because of a change in the analog signal path response of the analog signal path 222. For example, a bandwidth of the analog signal path 222 changes such that the digital filter no longer limits the bandwidth of the samples to fit the bandwidth of the analog signal path 222. As another example, noise, multipath propagation effects, and/or physical changes in the communication channel result in the digital filter no longer limiting the bandwidth of the samples to fit the bandwidth of the analog signal path 222. The communication channel 212 produces aliasing of the symbols and ISI.

Figure 8:
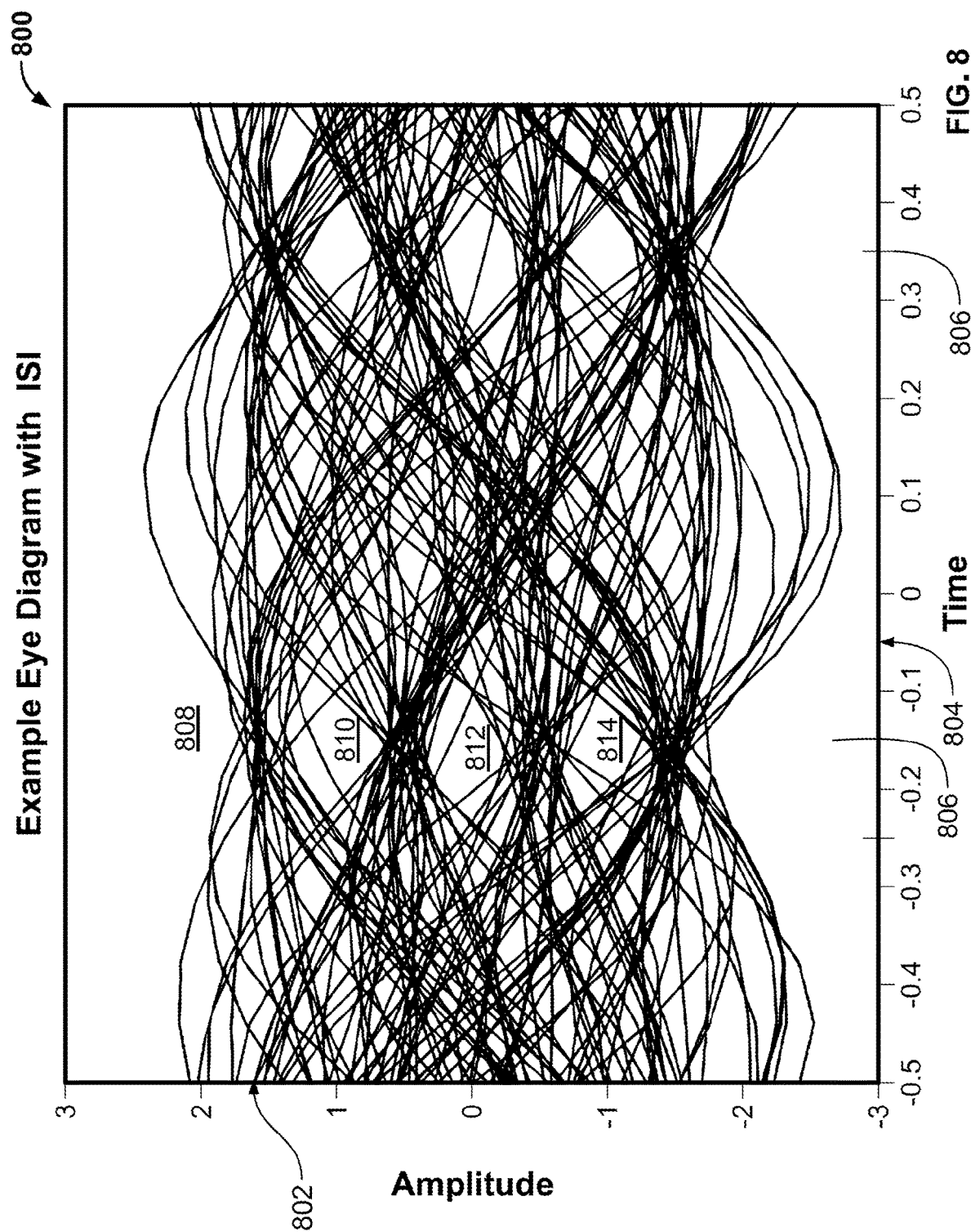
FIG. 8 illustrates an example eye diagram associated with the symbol signal in the presence of the ISI.

FIG. 8 illustrates an example eye diagram 800 associated with the symbol signal in the presence of the ISI. The eye diagram 800 plots amplitude of the symbol signal on axis 802 as a function of time on axis 804. A symbol may have one of four symbol levels in this example, rather than two symbol levels described above. In this regard, the symbol signal should have four distinct amplitudes associated with the four symbol levels at a symbol time 806. The symbol time may correspond to a time in die symbol signal when the symbol signal indicates a symbol level of a symbol. Eye diagram 800 shows that the four different amplitudes 808, 810, 813, 814 at the symbol time are not well defined, indicating LSI and possible error in determining the symbols actually encoded by the symbol encoder from the symbol signal. The symbols may be distorted by the communication channel 212.

The receiver system 204 may compensate for this distortion. The receiver system 204 has a receiver ADC 214, equalizer filter 216, receiver filter 218 and symbol decoder 220. The receiver ADC 214 may receive the symbol signal from the analog signal path 222. As the transmitter 210 transmitted the symbol signal as an analog signal, the receiver ADC 214 may have an analog to digital converter (ADC) which samples the symbol signal into samples. The symbol encoder 206 outputs the samples indicative of the symbols at the sampling rate of at least 2.5×N samples/sec, where 2.5 is a sampling factor. The receiver ADC 214 may sample the symbol signal at a receiver sampling rate. The receiver sampling rate does not have to match the sampling rate by the symbol encoder 206 so long as the receiver sampling rate and sampling rate by the symbol encoder is at least 2.5×N samples/sec.

The equalizer filter 216 is applied to the samples output by the receiver ADC 214. The equalizer filter 216 has a response which is an inverse to the analog signal path response so that the channel response of the communication channel 212 matches the response of the digital filter after the filtering by the receiver filter 218. The receiver filter 218 may correspond to the transmitter filter 208 such the combination of both the transmitter filter 208 and receiver filter 218 defines the digital filter. For example, if the digital filter is a raised cosine function and the transmitter filter 208 is a square root raised cosine function, then the receiver filter 218 may also be a square root raised cosine function. The samples output by the receiver filter 218 are input to a symbol decoder 220 winch converts the samples into the tool data 224. The symbol decoder may determine during a symbol period which symbol the samples in the symbol period are associated with. For example, if the amplitude of one or more of the samples are closer to 1 then, the symbol may be "1" while if the amplitude of one or more of the samples are closer to "−1" then, the symbol may be "−1." The symbol may then be converted to the tool data based on a same mapping applied by the symbol encoder 206. For example, the "−1" may be assigned to a "0" bit while the "1" may be assigned to a "1" bit.

The tool data may also include error correction and/or error detection code. The error correction and/or error detection code may be parity code and/or checksum code that facilitates correction and/or detection of errors in the tool data due to noise or even small amounts of ISI so that the tool data output by the symbol decoder 220 matches the tool data input into the symbol encoder 206. Based on this processing, the tool data 224 input into the symbol encoder 206 matches the tool data 224 output by the symbol decoder 220, resulting in reliable transmission between the transmitter system 202 and receiver system 204.

The analog signal path response of the analog signal path 222 may change over time. For example, the path response may change as the logging tool is lowered into the wellbore of the geologic formation when the analog signal path is the cable. In this regard, the equalizer filter 216 is updated so that the communication channel response matches the response of the digital filter since the digital filter originally bandlimited the symbols to the initial bandwidth of the analog signal path which has now changed. An adaptive equalizer system 228 updates the equalizer filter 216 based on the tool data 224 output by the symbol decoder 220 so that the equalizer filter 216 continues to represent an inverse to the analog signal path response. Without this equalization, the symbol decoder 220 may incorrectly decode the symbols associated with the received samples by the receiver 214 even with the error correction and/or detection. For example, the amplitude of one or more of the samples may be closer to 1 and the symbol output may be "1" due to ISI, even though the actual symbol transmitted was a "−1." As another example, the amplitude of one or more of the samples may be closer to −1 and the symbol output may be "−1" due to ISI, even though the actual symbol transmitted was a "1."

The adaptive equalizer system 228 includes a symbol encoder 230, channel response filter 232, and adaptive equalizer 234. The symbol encoder 230 is coupled to an output of the symbol decoder 220 and receives the tool data 224 output by the symbol decoder 220. The symbol encoder 230 encodes the tool data 224 into one or more symbols similar to how the symbol encoder 206 encodes tool data to the one or more symbols. Further, the symbols are sampled to in a manner similar to the symbol encoder 206 to produce samples indicative of the samples, but at the receiver sampling rate. The samples output by the symbol encoder 230 is input into the channel response filter 232 which has a same response as the digital filter, e.g., sine, raised cosine, or Gaussian. The channel response filter 232 may filter the samples.

The samples output by the channel response filter 232 and the samples output by the receiver filter 218 are input into the adaptive equalizer 234. In one or more examples, the samples output by the receiver filter 218 may be delayed in a delay block 236 by a delay time associated with processing time of one or more of blocks 220, 230, 232, so that samples output by the receiver filter 218 are aligned with the samples output by the channel response filter 232. The samples output by the channel response filter 232 represent transmission of the symbols with no ISI. The samples output by the receiver filter 218 may have ISI due to a change in the analog signal path response of the analog signal path 222.

Figure 9:
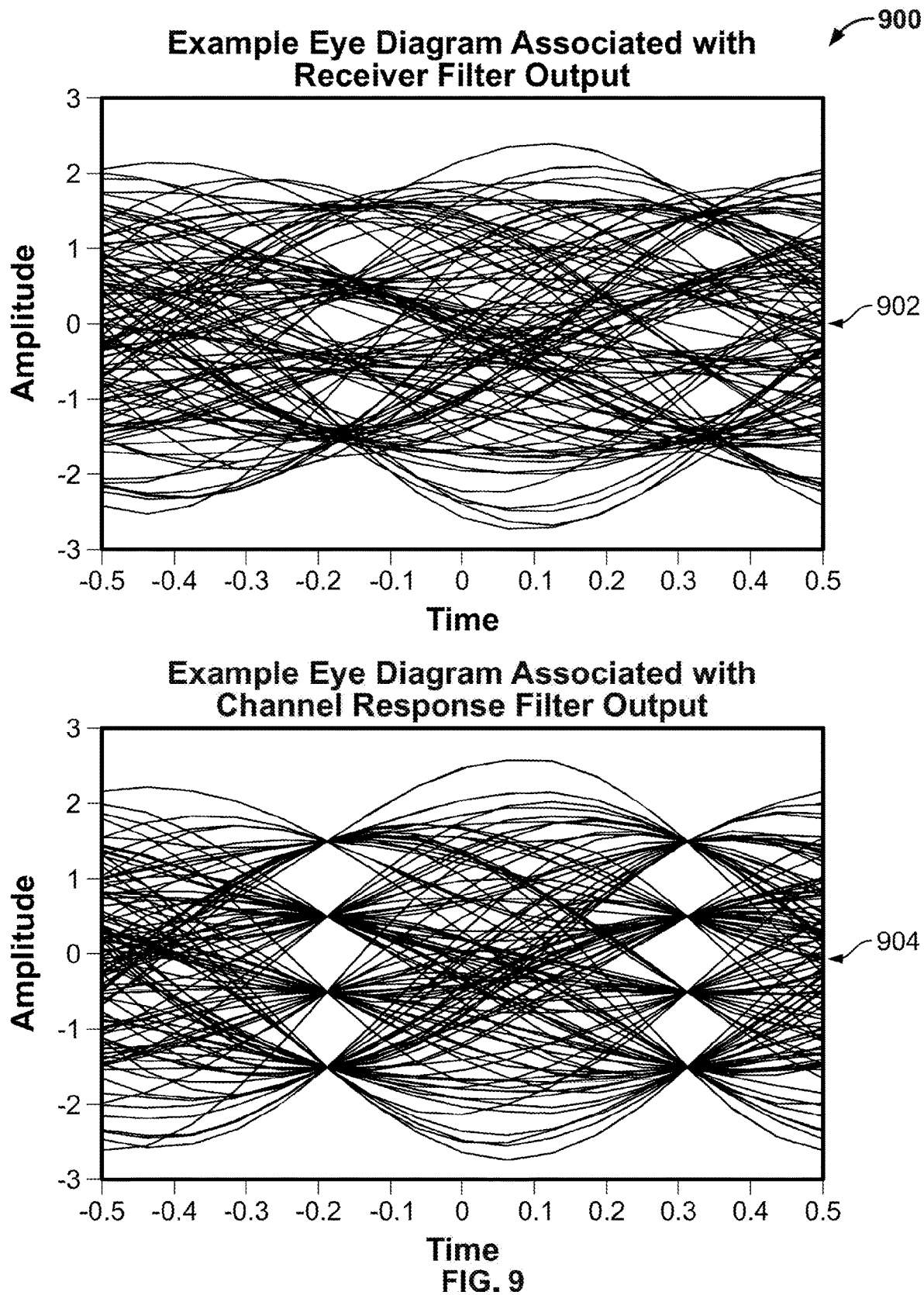
FIG. 9 illustrates example eye diagrams associated with an output of a receiver filter and the output of a channel response filter of an adaptive equalizer.

FIG. 9 illustrates example eye diagrams 900 associated with the output of the receiver filter and the output of the channel response filter for symbols having four levels. Eye diagram 902 shows that the sample amplitudes at the output of the receiver filter 218 at the symbol time are not precisely at four amplitudes indicating ISI. Eye diagram 904 shows that the sample amplitudes at the output of the channel response filter 232 at the symbol time is precisely at four amplitudes, indicating absence of ISI.

The adaptive equalizer 234 compares the samples output by the channel response filter 232 and the samples output by the receiver filter 218 to design filter coefficients which when applied to the samples output by the channel response filter 232 would produce the samples output by the receiver filter 218. The coefficient design may be based on a least mean squared (LMS) algorithm or other filter design algorithm. LMS compares the samples output by the receiver filter 218 to a reference which is the samples output by the channel response filter 232 and designs filter coefficients (e.g., an LMS filter) to filter the samples output by the receiver filter 218 in order to minimize difference between the samples output by the receiver filter 218 and the samples output by the channel response filter 232. The LMS filter may be indicative of the analog signal path response.

Figure 10:
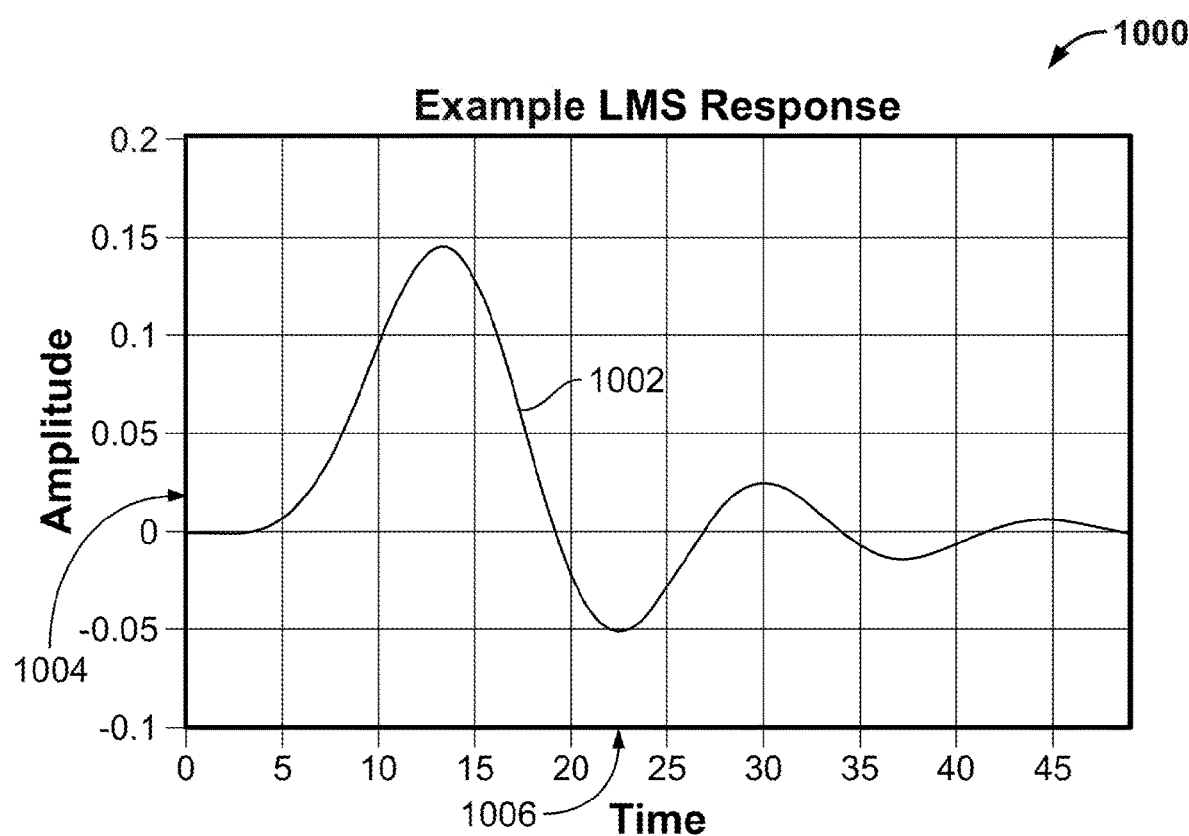
FIG. 10 illustrates an example of a least mean square (LMS) filter indicative of an analog signal path response.
Figure 10:
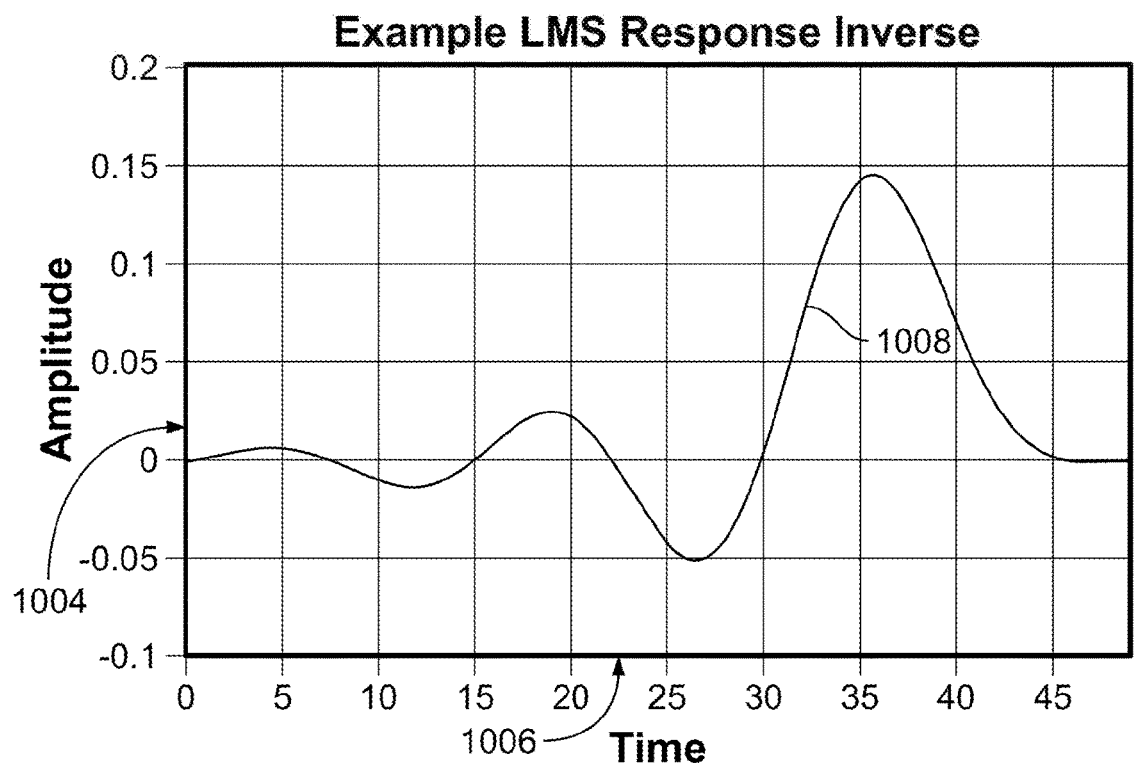

FIG. 10 illustrates example responses associated with the LMS filter 1000. Plot 1002 represents the analog signal path response as a function of time on axis 1004 and amplitude on axis 1006 based on the filter coefficients determined by the LMS filter, Plot 1008 represents the inverse of the analog signal path response. This inverse is provided to the equalizer filter 216. The inverse of the analog signal path response is applied to the samples output by the receiver 214 so that the channel response matches the response of the digital filter. In this regard, the equalizer filter 216 is used to filter the samples received by the receiver 214 such that the overall communication channel response satisfies the Nyquist ISI criteria and ISI is reduced in accordance with the digital filter.

Figure 11:
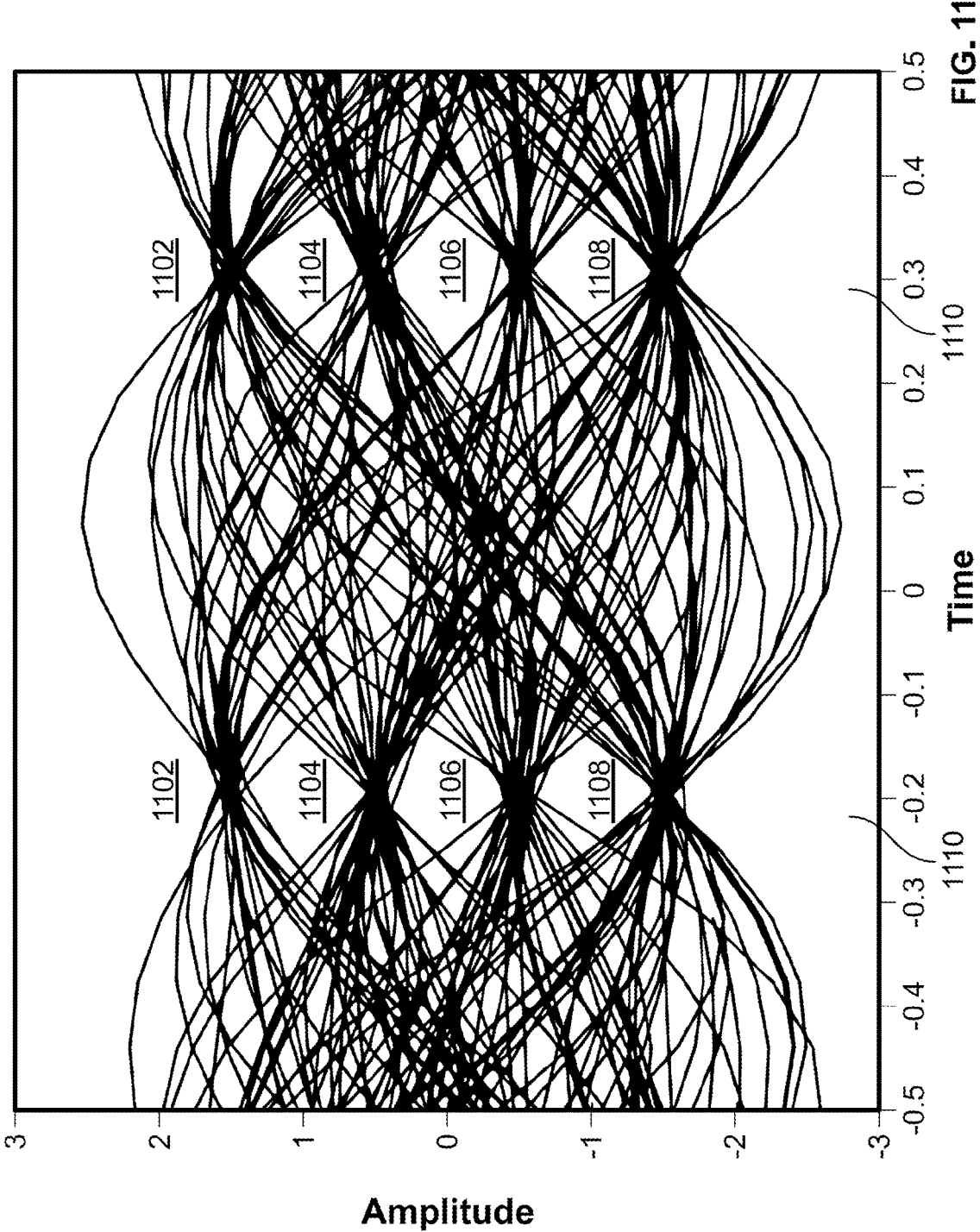
FIG. 11 illustrates an example eye diagram associated with applying adaptive equalization to the output of the receiver filter.

FIG. 11 illustrates an example eye diagram 1100 of the symbol signal as a result of the adaptive equalization. The amplitude 1102-1108 of the symbol signal at symbol times 1110 are more precisely at four amplitudes levels. In this regard, filtering by the equalizer filter with adaptive equalization reduces ISI.

The adaptive equalizer system 226 continues to update the equalizer filter 216 so long as symbol decoder 220 continues to decode the symbols transmitted by the transmitter system 202 into the tool data. Data throughput between the transmitter system 202 and receiver system 204 is not affected because the tool data is also used to update the equalizer filter 216 rather than only stopping/reducing the transmission of the tool data to periodically send training symbols to update the equalizer filter.

The examples described above relate to communication from the logging tool to the surface and equalization in this direction of communication. The surface may also have a transmitter system and the logging tool also have a receiver system which facilitates communication from the surface to the logging tool. Equalization may be performed in a manner similar to how equalization is performed when communication is from the logging tool to the surface. In this regard, data other than tool data may be used to perform the equalization. The other data may be data associated with operation of the logging tool and not training symbols used only to train the equalizer. Further, the described examples illustrate digital filtering and digital signal processing. Processing may be performed in an analog domain with analog filters and/or a combination of analog and digital filters with no loss of generality. Still further, the receiver system is generally described as located on the Earth's surface. With no loss of generality, the receiver system may also be located downhole and/or in one or more examples, one or more instances of the transmitter system and receiver system may be coupled together to facilitate communication between the logging tool and the computer.

Figure 12:
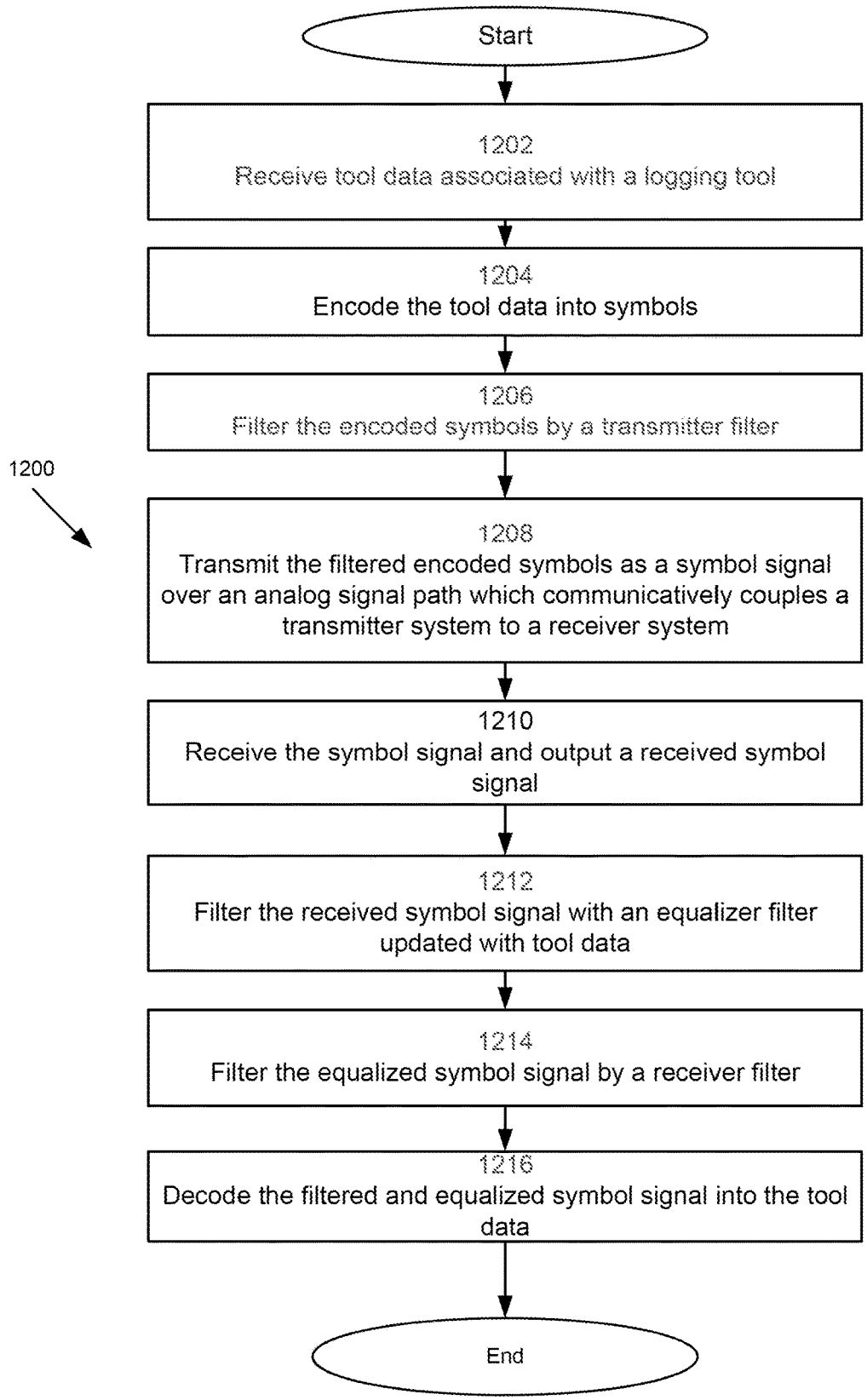
FIG. 12 is an example flow diagram of functions associated with communicating tool data associated with the logging tool lowered downhole in the geologic formation from the transmitter system associated with the logging tool to the receiver system on the Earth's surface.

FIG. 12 is a flow diagram of functions 1200 associated with communicating tool data from the transmitter system to the receiver system on the Earth's surface. The tool data may be communicated via an analog signal path whose analog signal path response changes, and the functions 1200 reduces ISI associated with the changed analog signal path response. The functions may be performed by one or more of the transmitter system and receiver system in hardware, software, or a combination of hardware and software.

At 1202, tool data associated with a logging tool or some other tool may be received. The logging tool or other tool may be positioned downhole in a geologic formation and perform various measurements associated with determining properties of rock and their contained fluid downhole in the geologic formation. Results of the measurements performed by formation sensors may be represented by the tool data.

Steps 1204 to 1206 relate to generating a symbol signal based on the tool data.

At 1204, a symbol encoder of a transmitter system may encode the tool data into symbols. The tool data may take the form of digital data such as bits. The symbols may be representative of one or more bits of the tool data. The tool data may be encoded into symbols at a symbol rate N. A symbol may have a symbol level indicative of the tool data that the symbol represents. In one or more examples, the symbol encoder may further sample the symbols at a sampling rate of at least 2.5 times the symbol rate. The sampling may be performed by representing the symbol as a sample with a sample amplitude associated with a symbol level and adding zero samples to the sample representing the symbol in accordance with the sampling rate, among other methods.

At 1206, the symbols output by the symbol encoder are filtered by a transmitter filter. The transmitter filter may be a filter with a response that reduces ISI associated with communication of symbols from the logging tool to the surface. The transmitter filter may take the form of a square root raised cosine function among other forms. The transmitter filter may be a filter with a response that reduces ISI associated with communication of symbols from the logging tool to the surface. In one or more examples, the samples associated with sampling the symbol are filtered by the transmitter filter.

At 1208, the transmitter may transmit the filtered symbols as a symbol signal over analog signal path which communicatively couple the transmitter system to the receiver system. In one or more examples, the transmitter may convert the samples filtered by the transmitter filter to an analog signal. The analog signal may be the symbol signal with pulses indicative of symbols.

An analog signal path response of the analog signal path may dynamically change. The changed analog signal path response may introduce ISI into the symbol signal.

At 1210, a receiver of the receiver system may receive the symbol signal and output a received symbol signal. In one or more examples, the receiver of the receiver system may receive the symbol signal, sample the symbol signal at a receiver sampling rate of at least 2.5 times the symbol rate, and output the samples to an equalizer filter of the receiver system.

Steps 1212 to 1216 relate to converting the received symbol signal to tool data.

At 1212, the equalizer filter may filter the received symbol signal with an equalizer filter such as an inverse to an analog signal path response so that ISI associated with the samples is reduced. In one or more examples, the equalizer filter may filter the samples output by the receiver with an inverse to an analog signal path response so that ISI associated with the samples is reduced. The equalizer filter may be adaptively updated based on the tool data and without having to stop and/or reduce transmission of the tool data between the transmitter system and receiver system to transmit training symbols. With the adaptive updating, the equalizer filter continues to represent the inverse of the analog signal path response even as the analog signal path response changes.

At 1214, the filtered symbol signal may be filtered by a receiver filter. In one or more examples, the samples filtered by the equalizer filter may be filtered by the receiver filter of the receiver system. The receiver filter may be a filter with a response that reduces ISI associated with communication of symbols from the logging tool to the surface. The receiver filter may take the form of a square root raised cosine function among other forms.

At 1216, a symbol decoder of the receiver system may decode the filtered equalized symbol signal into the tool data. In one or more examples, the symbol decoder of the receiver system may decode the samples filtered by the receiver filter into the tool data. The symbol decoder may determine a symbol associated with samples during a symbol period and then convert the symbol into tool data. The tool data may be ideally the same tool data which was encoded by the symbol encoder.

Figure 13:
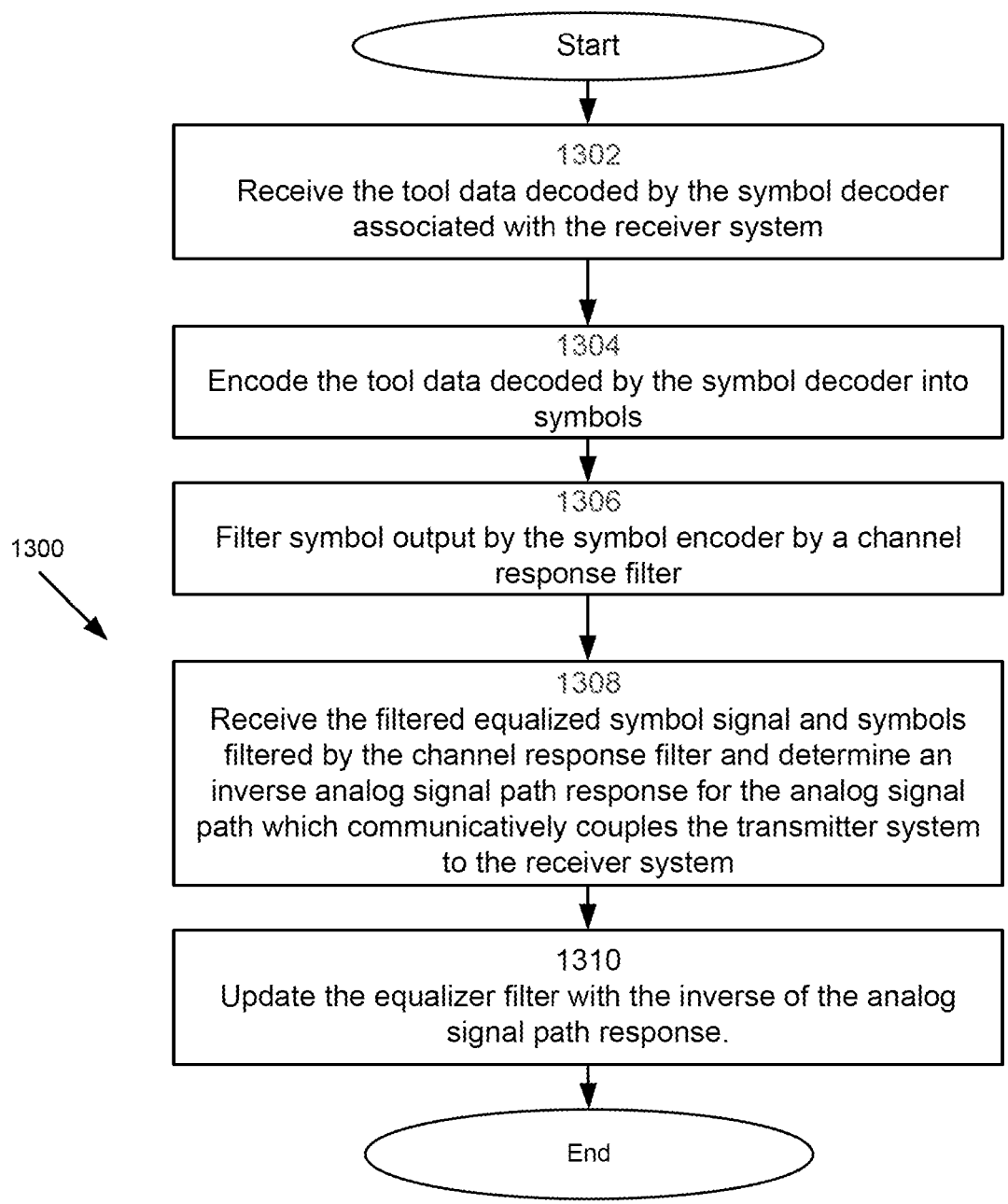
FIG. 13 is an example flow diagram of functions associated with updating an equalizer filter.

FIG. 13 is a flow diagram of functions 1300 associated with updating the equalizer filter with changes in the analog signal path response to reduce ISI associated with transmission of a symbol signal over the analog signal path. The functions may be performed by the adaptive equalizer system in hardware, software, or a combination of hardware and software.

At 1302, a symbol encoder associated with the receiver system may receive the tool data decoded by the symbol decoder associated with the receiver system. The tool data decoded by the decoder may be representative of corresponding tool data encoded by the symbol encoder associated with the transmitter system.

At 1304, the symbol encoder associated with the receiver system may encode the tool data into symbols. The tool data may be digital data such as bits. The symbols may be representative of one or more bits of the tool data. The tool data may be encoded into symbols at a symbol rate N. A symbol may have a symbol level indicative of the tool data that the symbol represents. In one or more examples, the symbol encoder associated with the receiver system may sample the symbols at a sampling rate of at least 2.5 times the symbol rate and which matches the receiver sampling rate. The sampling may be performed by representing the symbol as a sample with a sample amplitude associated with a symbol level and adding zero samples to the sample representing the symbol in accordance with the sampling, rate, among, other methods.

At 1306, the symbol output by the symbol encoder are filtered by a channel response filter. The channel response filter may be a filter with an ideal response associated with the communication channel that reduces ISI associated with communication of symbols from the logging tool to the surface. The channel response filter may take the form of a raised cosine function, sine function, or Gaussian function which matches the transmitter filter and receiver filter associated with the transmit system and receiver system.

At 1308, an adaptive equalizer receives the filtered equalized symbol signal from the receiver filter at 1214 and the symbols filtered by the channel response filter and determines an inverse analog signal path response to the analog signal path which communicatively couples the transmitter system to the receiver system. In one or more examples, the adaptive equalizer receives samples from the receiver filter associated with the receiver system and the samples filtered by the channel response filter and determines an inverse analog signal path response to the analog signal path which communicatively couples the transmitter system to the receiver system. The inverse analog signal path response is based on applying an LMS filter to the symbols filtered by the channel response filter and the filtered received symbol signal symbols which finds filter coefficients which minimizes a difference between the filtered received symbol signal symbols filtered by the filter coefficients and symbols filtered by the channel response filter.

At 1310, the adaptive equalizer updates the equalizer filter with the inverse of the analog signal path response. In this regard, so long as the symbol decoder outputs the tool data, the equalizer filter is updated to reflect the inverse of the analog signal path response, reducing ISI. The equalizer filter is updated while also receiving the tool data, and is not updated only during a training process where transmission of the tool data is halted and/or reduced to transmit training data already known to the receiver system to update the equalizer filter.

Figure 14:
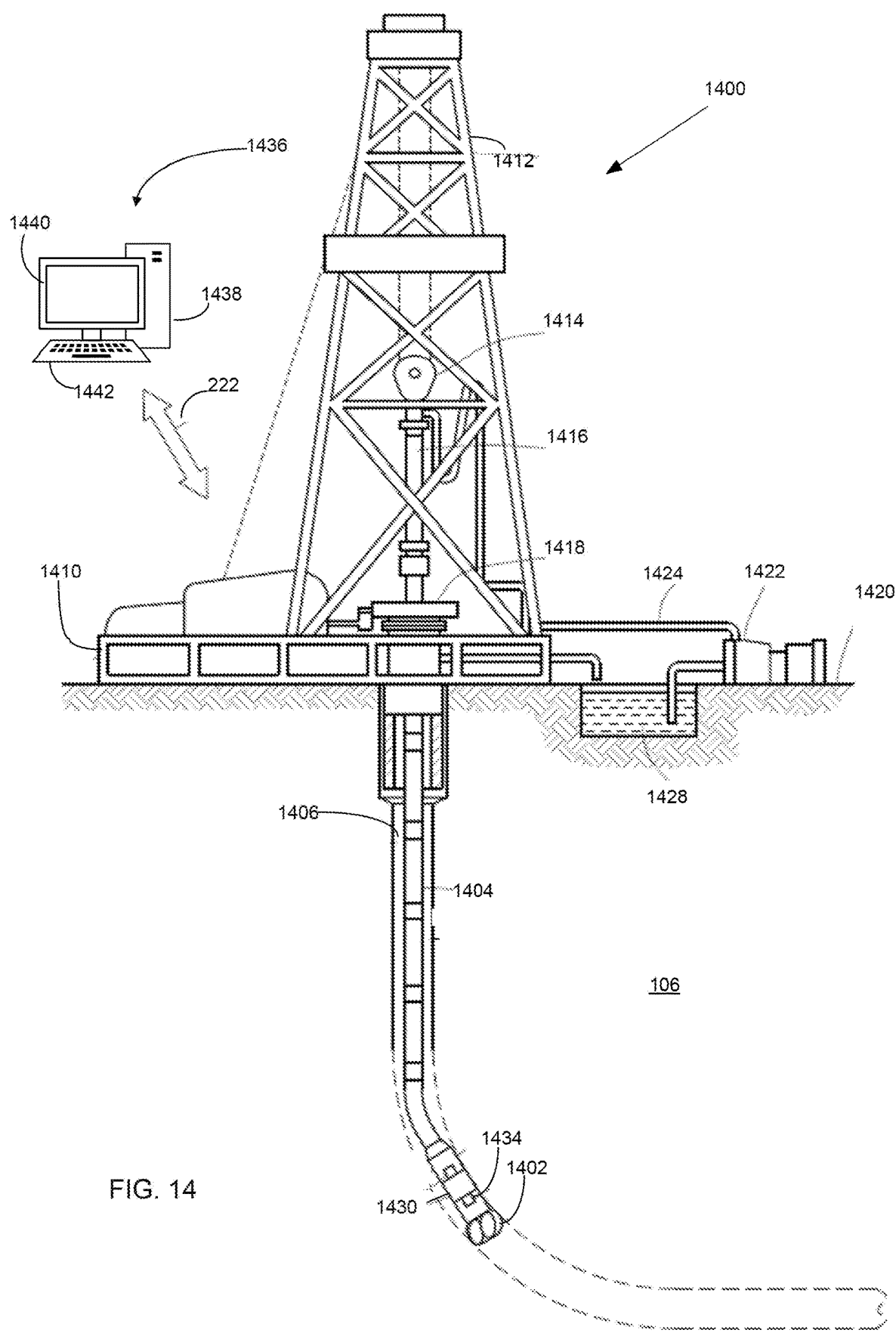
FIG. 14 illustrates an example system for reducing ISI associated with data communication between a logging tool lowered into a wellbore of a geologic formation as part of a drilling operation and a computer located on the Earth's surface of the geologic formation.

FIG. 14 illustrates an example system for reducing ISI associated with data communication between a logging tool lowered into a wellbore of a geologic formation as part of a drilling operation and a computer located on the Earth's surface of the geologic formation. The well system 1400 includes a drill bit 1402 disposed on a drill string 1404 of the well system 1400 for drilling a wellbore 1406 in a subsurface formation 106. While wellbore 1406 is shown extending generally vertically into the geologic formation 106, the principles described herein are also applicable to wellbores that extend at an angle through the geologic formation 106, such as horizontal and slanted wellbores. For example, the wellbore 1406 can be angled vertically followed by a low inclination angle, high inclination angle or horizontal placement of the well. It should further be noted that a land-based operation is depicted, but those skilled in the art will readily recognize that the principles described herein are equally applicable to subsea operations that employ floating or sea-based platforms and rigs, without departing from the scope of the disclosure.

The well system 1400 may further includes a drilling platform 1410 that supports a derrick 1412 having a traveling block 1414 for raising and lowering drill string 1404. Drill string 1404 may include, but is not limited to, drill pipe and coiled tubing, as generally known to those skilled in the ad. A kelly 1416 may support drift string 1404 as it may be lowered through a rotary table 1418. The drill bit 1402 may crush or cut rock, be attached to the distal end of drill string 1404 and be driven either be a downhole motor and/or via rotation of drill string 1404 from the surface 1420. Without limitation, drill hit 1402 may include, roller cone hits, PDC bits, natural diamond bits, any hole openers, reamers, coring bits, and the like. As drill bit 1402 rotates, it may create and extend wellbore 1406 that penetrates various subterranean formations. A pump 1422 may circulate drilling fluid (e.g., mud) through a feed pipe 1424 to kelly 1416, downhole through interior of drill string 1404, through orifices in drill bit 1402, back to surface 1420 via an annulus surrounding drill string 1404, and into a retention pit 1428.

Drill bit 1402 may be just one piece of the drill string 1404 that may include one or more drill collars 1430 and one or a plurality of logging tools 1434 such as logging-while-drilling (LWD) or measuring-while-drilling (MWD) tools for measuring, processing, and storing information such as the surveys and continuous measurements used to determine the depth to drill. It will also be understood that more than one logging tool 1434 (i.e., one or more LWD and/or MWD module) can be employed. Logging tool 1434 may be arranged to communicate with a computing system 1436. Any suitable technique may be used for transmitting signals from logging tool 1434 to the computing system 1436 residing on the surface 1420. As illustrated, an analog signal path 222 (which may be wired or wireless, for example) may be provided to transmit data from logging tool 1434 to the computing system 1436. Analog signal path 222 may implement one or more of various known drilling telemetry techniques such as acoustic, electromagnetic, etc. over the geologic formation 106, pressure pulses within mud, or take the form of a cable.

Computing system 1436 may include a processing unit 1438, a monitor 1440, an input device 1442 (e.g., keyboard, mouse, etc.), computer media (e.g., optical disks, magnetic disks), and a wellbore trajectory model 1450. The computing system 1436 can store code representative of reducing ISI over the analog signal path 222 in accordance with the operations described herein as the analog signal path response changes due to noise, multipath, and physical changes over the analog signal path 222, among other reasons. The computing system 1436 may be located at the surface, downhole, or partially at the surface and partially downhole. Computing system 1436 may act as a data acquisition system and possibly a data processing system that analyzes information from logging tool 1434.

Figure 15:
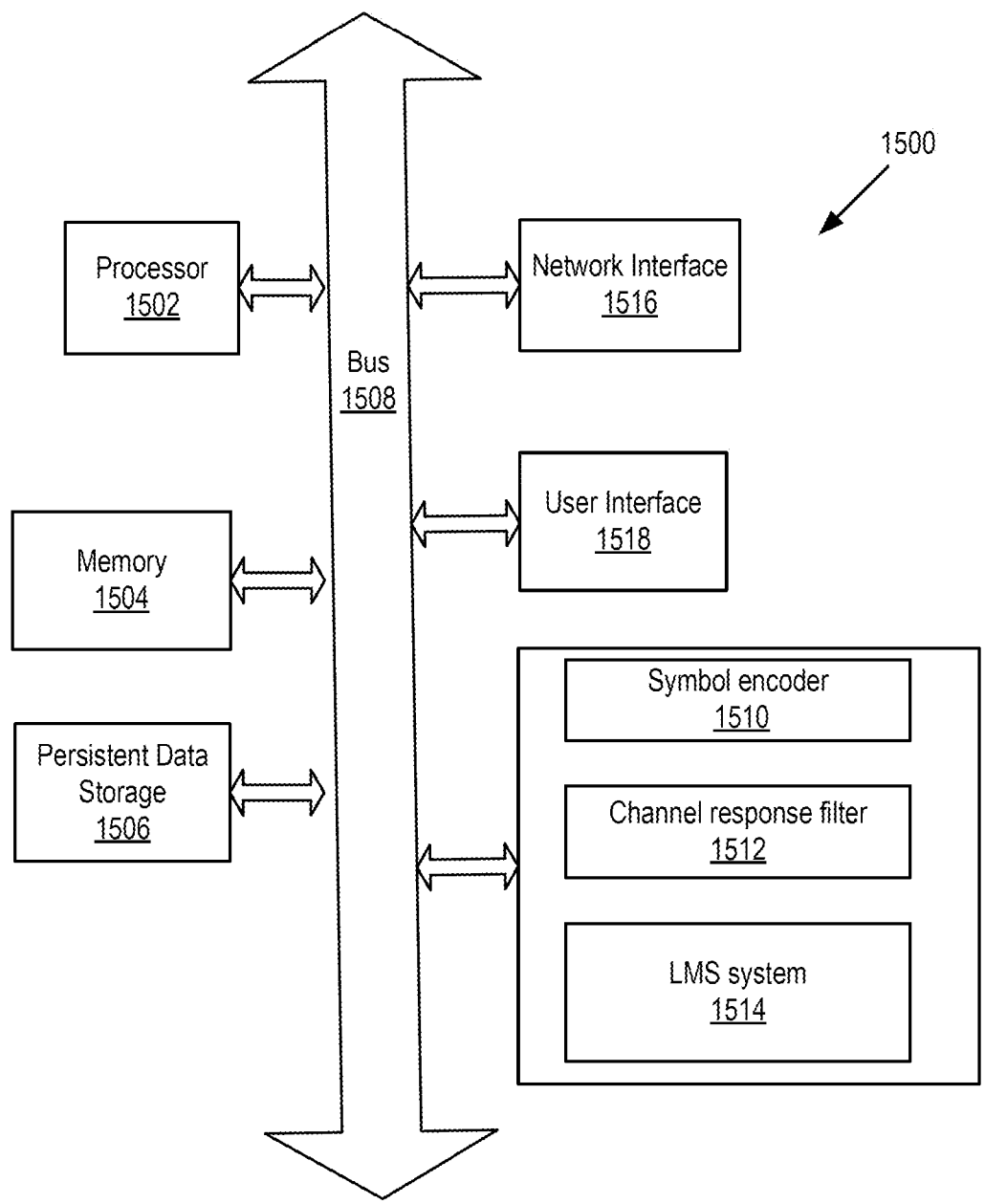
FIG. 15 is an example block diagram of the adaptive equalizer.

FIG. 15 is a block diagram of the adaptive equalizer system 1500 in more detail. The adaptive equalizer system 1500 may be associated the receiver system which facilitates communication of tool data from a logging tool downhole to computer on the Earth's surface via the analog signal path.

The adaptive equalizer system 1500 includes a processor 1502 (e.g., hardware possibly including multiple processors, multiple cores, multiple nodes, and/or implementing multi-threading, etc.) and memory 1504. The memory 1504 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more other possible realizations of non-transitory machine-readable media/medium.

The adaptive equalizer system 1500 may also include a persistent data storage 1506. The persistent data storage 1506 can be a hard disk drive, such as a magnetic storage device which stores tool data decoded by a symbol decoder. The persistent data storage 1506 may also store samples associated with a symbol signal received from the logging tool over the analog signal path and filtered by a receiver filter associated with the receiver system. These samples may have ISI. The persistent data storage 1506 may store other data as well.

The adaptive equalizer system 1500 also includes a bus 1508 (e.g., PCI, ISA, PCI-Express). The adaptive equalizer system 1500 may also have symbol encoder 1510 which encodes the tool data stored in the persistent data storage 1506 into symbols and outputs samples of the symbols. The adaptive equalizer system 1500 may have a channel response filter 1512 which filters the samples output by the symbol encoder to reduce ISI. The adaptive equalizer system 1500 may also have an LMS system 1514 which determines an inverse of an analog signal path response of an analog signal path over which the samples filtered by the receiver filter is received. The inverse of the analog signal path response is based on the samples output by the channel response filter 1512 and the samples filtered by the receiver filter. The inverse of the analog signal path response may be filter coefficients which are provided to the equalizer filter via a network interface 1516 coupled to the bus 1508.

In one or more examples, the adaptive equalizer system 1500 may further comprise a user interface 1518. The user interface 1518 may include a display such as a computer screen or other visual device to show and/or plot the analog signal path response and/or inverse of the analog signal path response and how it dynamically changes over time. The user interface 1518 may also include an input device such as a mouse, keyboard.

The adaptive equalizer system 1500 may implement any one of the previously described systems partially (or entirely) in hardware and/or software (e.g., computer code, computer instructions, program instructions, program code) stored on a non-transitory machine readable medium/media. In some instances, the software is executed by the processor 1502. Further, realizations can include fewer or additional components not illustrated in FIG. 15 (e.g., video cards, audio cards, additional network interfaces, peripheral devices, etc.). The processor 1502 and the memory 1504 are coupled to the bus 1508. Although illustrated as being coupled to the bus 1508, the memory 1504 can be coupled to the processor 1502.

The flowcharts are provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order. For example, the operations depicted in blocks 1202 to 1216 and 1302-1310 can be performed in parallel or concurrently. It will be understood that each block of the flowchart illustrations and/or block diagrams, and combinations of blocks in the flowchart illustrations and/or block diagrams, can be implemented by program code. The program code may be provided to a processor of a general purpose computer, special purpose computer, or other programmable machine or apparatus.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "system" or "system." The functionality presented as individual systems/units in the example illustrations can be organized differently in accordance with any one of platform (operating system and/or hardware), application ecosystem, interfaces, programmer preferences, programming language, administrator preferences, etc.

Any combination of one or more machine readable medium(s) may be utilized. The machine readable medium may be a machine readable signal medium or a machine readable storage medium. A machine readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine readable storage medium may be any tangible medium that can contain, or store a program for use by or in connection with an instruction execution system, apparatus, or device. A machine readable storage medium is not a machine readable signal medium.

A machine readable signal medium may include a propagated data signal with machine readable program code embodied therein, for example, in baseband or as part of a carrier wave. Such a propagated signal may take any of a variety of forms, including, but not limited to, electromagnetic, optical, or any suitable combination thereof. A machine readable signal medium may be any machine readable medium that is not a machine readable storage medium and that can communicate, propagate, or transport a program for use by or in connection with an instruction execution system, apparatus, or device.

Program code embodied on a machine readable medium may be transmitted using any appropriate medium, including but not limited to wireless, wireline, optical fiber cable, RF, etc., or any suitable combination of the foregoing.

Computer program code for carrying out operations for aspects of the disclosure may be written in any combination of one or more programming languages, including an object oriented programming language such as the Java® programming language, C++ or the like; a dynamic programming language such as Python; a scripting language such as Perl programming language or PowerShell script language; and conventional procedural programming languages, such as the "C" programming language or similar programming languages. The program code may execute entirely on a stand-alone machine, may execute in a distributed manner across multiple machines, and may execute on one machine while providing results and or accepting input on another machine.

The program code/instructions may also be stored in a machine readable medium that can direct a machine to function in a particular manner, such that the instructions stored in the machine readable medium produce an article of manufacture including instructions which implement the function/act specified in the flowchart and/or block diagram block or blocks.

While the aspects of the disclosure are described with reference to various implementations and exploitations, it will be understood that these aspects are illustrative and that the scope of the claims is not limited to them. In general, techniques for equalization as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure. In general, structures and functionality presented as separate components in the example configurations may be implemented as a combined structure or component. Similarly, structures and functionality presented as a single component may be implemented as separate components. These and other variations, modifications, additions, and improvements may fall within the scope of the disclosure.

As used herein, the term "or" is inclusive unless otherwise explicitly noted. Thus, the phrase "at least one of A, B, or C" is satisfied by any element from the set {A, B, C} or any combination thereof, including multiples of any element.

Example Embodiments

Example embodiments include the following:

Embodiment 1 is a method, the method comprising: positioning a tool downhole in a wellbore, wherein the tool communicates with a receiver system over an analog signal path; receiving first tool data associated with the tool; encoding the first tool data into first symbols; generating a symbol signal based on the first symbols; transmitting the symbol signal to the receiver system via the analog signal path; filtering the symbol signal by one or more filters which includes an equalizer filter, wherein the equalizer filter is indicative of an analog signal path response of the analog signal path, and wherein the equalizer filter reduces intersymbol interference associated with the symbol signal; decoding, by the receiver system, the filtered symbol signal into second tool data; encoding, by the receiver system, the second tool data into second symbols; based on the second symbols, generating an updated analog signal path response of the analog signal path; updating the equalizer filter based on the updated analog signal path response; and filtering, by the updated equalizer filter, the symbol signal. Embodiment 1 further comprises generating a formation log of formation properties based on the second tool data. Determining the updated analog signal path response of the analog signal path as described in any of the preceding embodiments comprises continuously updating the analog signal path response as the filtered symbol signal is decoded into the second tool data. Generating the updated analog signal path response of the analog signal path as described in any of the preceding embodiments does not affect throughput of the first tool data to the receiver system. Generating the updated analog signal path response of the analog signal path comprises as described in any of the preceding embodiments determining filter coefficients which reduce a difference between reference samples associated with the second tool data filtered by the filter coefficients and receiver samples associated with the symbol signal. Updating the equalizer filter based on the updated analog signal path response as described in any of the preceding embodiments comprises inverting the filter coefficients. The analog signal path as described in any of the preceding embodiments is selected from the group comprising a twisted pair cable, electrical cable, and fiber optic cable. Generating the symbol signal based on the first symbols as described in any of the preceding embodiments comprises filtering the first symbols by a first filter; wherein filtering the symbol signal by one or more fillers comprises filtering the symbol signal by a second filter and the equalizer filter; wherein the first filter and second filter define a channel response filter; and wherein generating the updated analog signal path response of the analog signal path comprises filtering the second symbols with a third filter having a response that matches the channel response filter.

Embodiment 2 is a system, the system comprising: a tool positioned downhole in a wellbore; a receiver system; an analog signal path, wherein the tool communicates with the receiver system over the analog signal path; a transmitter system comprising program code stored in a non-transitory machine readable media and executable by a processor to perform the functions of: receiving first tool data associated with the tool; encoding the first tool data into first symbols; generating a symbol signal based on the first symbols; transmitting the symbol signal via the analog signal path; a receiver system comprising program code stored in a non-transitory machine readable media and executable by a processor to perform the functions of: receiving the symbol signal from the transmitter system; filtering the symbol signal by one or more filters which includes an equalizer filler, wherein the equalizer filter is indicative of an analog signal path response of the analog signal path, and wherein the equalizer filter reduces intersymbol interference associated with the symbol signal; decoding, by the receiver system, the filtered symbol signal into second tool data; encoding, by the receiver system, the second tool data into second symbols; based on the second symbols, generating an updated analog signal path response of the analog signal path; updating the equalizer filter based on the updated analog signal path response; and filtering, by the updated equalizer filter, the symbol signal. Embodiment 2 further comprises program code to generate a formation log based on the second tool data. The program code to determine the updated analog signal path response of the analog signal path based on the second tool data as described in any of the preceding embodiments of Embodiment 2 comprises program code to continuously update the analog signal path response as the filtered symbol signal is decoded into the second tool data. The program code to generate the updated analog signal path response of the analog signal path as described in any of the preceding embodiments of Embodiment 2 does not affect throughput of the first tool data to the receiver system. The program code to generate the updated analog signal path response of the analog signal path as described in any of the preceding embodiments of Embodiment 2 comprises program code to determine filter coefficients which reduce a difference between reference samples associated with the second tool data filtered by the filter coefficients and receiver samples associated with the symbol signal. The program code to update the equalizer filter based on the updated analog signal path response as described in any of the preceding embodiments of Embodiment 2 comprises program code to invert the filter coefficients. The analog signal path as described in any of the preceding embodiments of Embodiment 2 is selected from the group comprising a twisted pair cable, electrical cable, and fiber optic cable. The program code to generate the symbol signal based on the first symbols as described in any of the preceding embodiments of Embodiment 2 comprises program code to filter the first symbols by a first filter; wherein the program code to filter the symbol signal by one or more filters comprises program code to filter the symbol signal by a second filter and the equalizer filter; wherein the first filter and second filter define a channel response filter; and wherein the program code to generate the updated analog signal path response of the analog signal path comprises program code to filter the second symbols with a third filter having a response that matches the channel response filter.

Embodiment 3 is a non-transitory machine readable media comprising program code executable by a processor to: receive a symbol signal via an analog signal path from a transmitter system, wherein the transmitter system receives first tool data associated with a tool positioned downhole in a wellbore, encodes the first tool data into first symbols, generates a symbol signal based on the first symbols, and transmits the symbol signal via the analog signal path; filter the symbol signal by one or more filters which includes an equalizer filter, wherein the equalizer filter is indicative of an analog signal path response of the analog signal path, and wherein the equalizer filter reduces intersymbol interference associated with the symbol signal; decode, by the receiver system, the filtered symbol signal into second tool data; encode, by the receiver system, the second tool data into second symbols; based on the second symbols, generate an updated analog signal path response of the analog signal path; update the equalizer filter based on the updated analog signal path response; and filter, by the updated equalizer filter, the symbol signal. The program code to generate the updated analog signal path response of the analog signal path of Embodiment 3 comprises program code to continuously update the analog signal path response as the filtered symbol signal is decoded into the second tool data. The program code to generate the updated analog signal path response of the analog signal path as described in any of the preceding embodiments of Embodiment 3 does not affect throughput of the first tool data to the receiver system. The program code to generate the updated analog signal path response of the analog signal path as described in any of the preceding embodiments of Embodiment 3 comprises program code to determine filter coefficients which reduce a difference between reference samples associated with the second tool data filtered by the filter coefficients and receiver samples associated with the symbol signal

What is claimed is:

1. A method comprising:
    positioning a tool downhole in a wellbore, wherein the tool communicates with a receiver system over an analog signal path;
    receiving first tool data associated with the tool;
    encoding the first tool data into first symbols;
    generating a symbol signal based on the first symbols;
    transmitting the symbol signal to the receiver system via the analog signal path;
    filtering, at the receiver system, the symbol signal by one or more filters which includes an equalizer filter and a receiver filter, wherein the equalizer filter is indicative of an inverse analog signal path response of the analog signal path, and wherein the equalizer filter reduces intersymbol interference associated with the symbol signal;
    decoding, by a symbol decoder of the receiver system, the filtered symbol signal into second tool data, wherein the second tool data corresponds to the first tool data;
    encoding, by an adaptive equalizer system of the receiver system, the second tool data into second symbols;
    filtering, using a channel response filter of the adaptive equalizer system, the second symbols, the channel response filter using a filter function that matches the equalizer filter;
    generating, by an adaptive equalizer of the adaptive equalizer system, an updated inverse analog signal path response of the analog signal path based on a filtered equalizer symbol signal received from the receiver filter and the second symbols that have been filtered by the channel response filter;
    updating the equalizer filter based on the updated inverse analog signal path response so that the equalizer filter continues to represent the inverse analog signal path response; and
    filtering, by the updated equalizer filter, the symbol signal received at the receiver system over the analog signal path.

2. The method of claim 1, further comprising generating a formation log of formation properties based on the second tool data.

3. The method of claim 1, wherein determining the updated inverse analog signal path response of the analog signal path comprises continuously updating the analog signal path response as the filtered symbol signal is decoded into the second tool data.

4. The method of claim 1, wherein generating the updated inverse analog signal path response of the analog signal path does not affect throughput of the first tool data to the receiver system.

5. The method of claim 1, wherein generating the updated inverse analog signal path response of the analog signal path comprises determining filter coefficients which reduce a difference between reference samples associated with the second tool data filtered by the filter coefficients and receiver samples associated with the symbol signal.

6. The method of claim 5, wherein updating the equalizer filter based on the updated inverse analog signal path response comprises inverting the filter coefficients.

7. The method of claim 1, wherein the analog signal path is selected from the group comprising a twisted pair cable, electrical cable, and fiber optic cable.

8. The method of claim 1, wherein the filter function used by the channel response filter and the equalizer filter comprises a raised cosine filter.

9. A system comprising:
a tool positioned downhole in a wellbore;
a receiver system;
an analog signal path, wherein the tool communicates with the receiver system over the analog signal path;
a transmitter system comprising program code stored in a non-transitory machine readable media and executable by a processor to perform the functions of:
receiving first tool data associated with the tool;
encoding the first tool data into first symbols;
generating a symbol signal based on the first symbols;
transmitting the symbol signal via the analog signal path;
the receiver system comprising program code stored in a non-transitory machine readable media and executable by a processor to perform the functions of:
receiving the symbol signal from the transmitter system;
filtering the symbol signal by one or more filters which includes an equalizer filter and a receiver filter, wherein the equalizer filter is indicative of an inverse analog signal path response of the analog signal path, and wherein the equalizer filter reduces intersymbol interference associated with the symbol signal;
decoding, by the receiver system, the filtered symbol signal into second tool data,
wherein the second tool data corresponds to the first tool data;
encoding, by an adaptive equalizer system of the receiver system, the second tool data into second symbols;
filtering, using a channel response filter of the adaptive equalizer system, the second symbols, the channel response filter using a filter function that matches the equalizer filter;
generating, by an adaptive equalizer of the adaptive equalizer system, an updated inverse analog signal path response of the analog signal path based on a filtered equalizer symbol signal received from the receiver filter and the second symbols that have been filtered by the channel response filter;
updating the equalizer filter based on the updated inverse analog signal path response so that the equalizer filter continues to represent the inverse analog signal path response; and
filtering, by the updated equalizer filter, the symbol signal received at the receiver system over the analog signal path.

10. The system of claim 9, further comprising program code to generate a formation log based on the second tool data.

11. The system of claim 9, wherein the program code to determine the updated inverse analog signal path response of the analog signal path, based on the second tool data comprises program code to continuously update the analog signal path response as the filtered symbol signal is decoded into the second tool data.

12. The system of claim 9, wherein the program code to generate the updated inverse analog signal path response of the analog signal path, does not affect throughput of the first tool data to the receiver system.

13. The system of claim 9, wherein the program code to generate the updated inverse analog signal path response of the analog signal path, comprises program code to determine filter coefficients which reduce a difference between reference samples associated with the second tool data filtered by the filter coefficients and receiver samples associated with the symbol signal.

14. The system of claim 13, wherein the program code to update the equalizer filter based on the updated inverse analog signal path response comprises program code to invert the filter coefficients.

15. The system of claim 9, wherein the analog signal path is selected from the group comprising a twisted pair cable, electrical cable, and fiber optic cable.

16. The system of claim 9, wherein the filter function used by the channel response filter and the equalizer filter comprises a raised cosine filter.

17. A non-transitory machine readable media comprising program code executable by a processor to:
receive, at a receiver system, a symbol signal via an analog signal path from a transmitter system, wherein the transmitter system receives first tool data associated with a tool positioned downhole in a wellbore, encodes the first tool data into first symbols, generates a symbol signal based on the first symbols, and transmits the symbol signal via the analog signal path;
filter the symbol signal by one or more filters which includes an equalizer filter and a receiver filter, wherein the equalizer filter is indicative of an inverse analog signal path response of the analog signal path, and wherein the equalizer filter reduces intersymbol interference associated with the symbol signal;
decode, by a decoder of the receiver system, the filtered symbol signal into second tool data, wherein the second tool data corresponds to the first tool data;
encode, by an adaptive equalizer of the receiver system, the second tool data into second symbols;
filtering, using a channel response filter of the adaptive equalizer system, the second symbols, the channel response filter using a filter function that matches the equalizer filter;
generate, by an adaptive equalizer of the adaptive equalizer system, an updated inverse analog signal path response of the analog signal path based on a filtered equalizer symbol signal received from the receiver filter and the second symbols that have been filtered by the channel response filter;
update the equalizer filter based on the updated inverse analog signal path response so that the equalizer filter continues to represent the inverse analog signal path response; and
filter, by the updated equalizer filter, the symbol signal received at the receiver system over the analog signal path.

18. The non-transitory machine readable media of claim 17, wherein the program code to generate the updated inverse analog signal path response of the analog signal path comprises program code to continuously update the analog signal path response as the filtered symbol signal is decoded into the second tool data.

19. The non-transitory machine readable media of claim 17, wherein the program code to generate the updated inverse analog signal path response of the analog signal path does not affect throughput of the first tool data to the receiver system.

20. The non-transitory machine readable media of claim 17, wherein the program code to generate the updated inverse analog signal path response of the analog signal path comprises program code to determine filter coefficients which reduce a difference between reference samples associated with the second tool data filtered by the filter coefficients and receiver samples associated with the symbol signal.

\* \* \* \* \*